(12) United States Patent
Bushman et al.

(10) Patent No.: US 8,380,622 B2
(45) Date of Patent: Feb. 19, 2013

(54) SECURE ELECTRONIC PAYMENT MESSAGING SYSTEM WITH RECONCILABLE FINALITY

(75) Inventors: Martin B. Bushman, Fullerton, CA (US); Scott M. Volmar, Fullerton, CA (US); Richard A. Lee, Alpharetta, GA (US); Jean-Yves Gresser, Paris (FR); John D. R. Spain, Anniston, AL (US)

(73) Assignee: Intercomputer Corporation, Fullerton, CA (US)

( * ) Notice: Subject to any disclaimer, the term of this patent is extended or adjusted under 35 U.S.C. 154(b) by 611 days.

(21) Appl. No.: 12/355,695

(22) Filed: Jan. 16, 2009

(65) Prior Publication Data

US 2009/0319422 A1 Dec. 24, 2009

Related U.S. Application Data

(63) Continuation of application No. 10/679,275, filed on Oct. 10, 2003, now abandoned.

(60) Provisional application No. 60/417,697, filed on Oct. 10, 2002.

(51) Int. Cl.
*G06Q 40/00* (2012.01)

(52) U.S. Cl. ............... 705/39; 713/155

(58) Field of Classification Search ............ 705/35, 705/39, 40, 44, 64, 65, 67, 72, 75–77; 713/155, 713/156, 168, 169, 175, 176; 726/2, 4, 5, 726/17, 18

See application file for complete search history.

(56) References Cited

U.S. PATENT DOCUMENTS

| | | |
|---|---|---|
| 5,465,206 A | 11/1995 | Hilt et al. |
| 5,677,955 A | 10/1997 | Doggett et al. |
| 5,903,882 A | 5/1999 | Asay et al. |
| 5,956,700 A | 9/1999 | Landry |
| 6,021,202 A | 2/2000 | Anderson et al. |
| 6,144,848 A | 11/2000 | Walsh et al. |
| 6,151,676 A | 11/2000 | Cuccia et al. |
| 6,167,378 A | 12/2000 | Webber, Jr. |
| 6,209,095 B1 | 3/2001 | Anderson et al. |
| 6,292,789 B1 | 9/2001 | Schutzer |
| 6,609,200 B2 | 8/2003 | Anderson et al. |
| 6,661,910 B2 | 12/2003 | Jones et al. |
| 6,732,278 B2 | 5/2004 | Baird et al. |
| 6,769,060 B1 | 7/2004 | Dent et al. |

(Continued)

FOREIGN PATENT DOCUMENTS

| | | |
|---|---|---|
| EP | 1061484 A2 | 12/2000 |
| EP | 1388797 A2 | 2/2004 |

(Continued)

OTHER PUBLICATIONS

Jonathan D. Moffett, Control Principles and Role Hierarchies, Proceedings of the 3$^{rd}$ ACM Workshop on Role Based Access (RBAC), Oct. 22-23, 1998, George Mason University, Fairfax, VA ACM Press ISBN 1 55113 113 5, pp. 63-69.

(Continued)

*Primary Examiner* — Mary Cheung

(74) *Attorney, Agent, or Firm* — Knobbe Martens Olson & Bear LLP

(57) ABSTRACT

A transfer network system for providing communications between commercial buyers and suppliers and their respective banks is provided. Client systems in communication with the transfer network system operate under a secure legal and technical regime in order to provide an architecture that supports the exchange of messages to conduct commerce. This commerce may include instructions related to the transfer of funds directly from an account of the buyer to the supplier. Because of the secure legal and technical framework, this financial transaction can be conducted in real-time and finalized in real-time without the need for delay or the use of clearinghouse to settle the transaction.

12 Claims, 39 Drawing Sheets

U.S. PATENT DOCUMENTS

| | | |
|---|---|---|
| 7,120,606 B1 | 10/2006 | Ranzini et al. |
| 7,146,338 B2 | 12/2006 | Kight et al. |
| 7,236,957 B2 | 6/2007 | Crosson Smith |
| 7,496,765 B2 | 2/2009 | Sengoku |
| 7,603,556 B2 | 10/2009 | Brown et al. |
| 2001/0018739 A1 | 8/2001 | Anderson et al. |
| 2001/0044778 A1 | 11/2001 | Hoshino et al. |
| 2002/0026575 A1 | 2/2002 | Wheeler et al. |
| 2002/0111913 A1 | 8/2002 | Tallent et al. |
| 2002/0112183 A1 | 8/2002 | Baird, III et al. |
| 2003/0004867 A1 | 1/2003 | Kight et al. |
| 2003/0069842 A1 | 4/2003 | Kight et al. |
| 2003/0093680 A1 | 5/2003 | Astley et al. |
| 2004/0123113 A1 | 6/2004 | Mathiassen et al. |
| 2004/0188519 A1 | 9/2004 | Cassone |
| 2005/0108157 A1 | 5/2005 | Bushman et al. |
| 2005/0177518 A1 | 8/2005 | Brown |
| 2007/0192601 A1 | 8/2007 | Spain et al. |

FOREIGN PATENT DOCUMENTS

| | | |
|---|---|---|
| EP | 1550066 | 7/2005 |
| GB | 2333878 A | 8/1999 |
| WO | WO 98-26386 A1 | 6/1998 |
| WO | WO 00-67143 A2 | 11/2000 |
| WO | WO 02-01517 A1 | 1/2002 |
| WO | WO 2004-034226 A | 4/2004 |

OTHER PUBLICATIONS

Kravitz et al., "FSML—Financial Services Markup Language," Version 1.5, 1999, FSTC.

Menezes et al., "Handbook of Applied Cryptography," Handbook of Applied Cryptography, CRC Press Series on Discrete Mathematics and Its Applications, Boca Raton, FL, CRC Press, US, 1997, pp. 390, 401-403, 497-499.

Pays et al., An Intermediation and Payment System Technology, May 1996, Computer Networks and ISDN Systems, North Holland Publishing. Amsterdam, NL, pp. 1197-1206, XP004018220 ISSN: 0169-7552.

International Search Report from PCT/US2003/032184, Apr. 22, 2004, 3 pages.

International Search Report from PCT/US2005/012235, Aug. 4, 2005, 4 pages.

International Search Report from PCT/US2006/030517, Dec. 12, 2006, 4 pages.

Office Action dated Nov. 9, 2007 from Related U.S. Appl. No. 10/679,275.

Office Action dated Jul. 16, 2008 from Related U.S. Appl. No. 10/679,275.

Office Action dated Oct. 16, 2008 from Related U.S. Appl. No. 11/104,290.

Office Action dated Aug. 12, 2009 from Related U.S. Appl. No. 11/104,290.

FIG. 4 High Level Messaging Process Diagram
- Message Creation and Transmission

| Sender of message | ICN High Level Process | Step Number |
|---|---|---|
| (Logon) | VPN established or activated with sender | 1 |
| Entry workstation login | | 2 |
| Message created | | 3 |
| Message audit file created | | 4 |
| | Message audit file received | 5 |
| Signed & encrypted message sent to ICN | | 6 |
| | Message received | 7 |
| | Validity of message checked by comparing audit and encrypted message | 8 |
| | Message validation response created | 9 |
| Message validation response received | | 10 |
| | VPN inactive | 11 |

*FIG. 5*  High Level Messaging Process Diagram
- Send a message with Approval

| Sender of message | ICN High Level Process | Step Number |
|---|---|---|
| (Logon) | VPN established or activated with sender | 1 |
| Entry workstation login | | 2 |
| Message created | | 3 |
| Message audit file created | | 4 |
| | Message audit file received | 5 |
| Management workstation login | | 6 |
| Message approval created | | 7 |
| Message approval audit file created | | 8 |
| | Message approval audit file received | 9 |
| Signed & encrypted message sent to ICN | | 10 |
| | Message received | 11 |
| Signed & encrypted message approval sent to ICN | | 12 |
| | Message approval received | 13 |
| | Validity of message checked by comparing message audit file, encrypted message, message approval audit file, and encrypted message approval. | 14 |
| | Message validation response created | 15 |
| Message validation response | | 16 |
| | VPN inactive | 17 |

*FIG. 6* High Level Messaging Process Diagram
- Receive a message

| ICN High Level Process | Recipient of message | Step Number |
|---|---|---|
| VPN established or activated with receiver | (Logon) | 1 |
|  | Entry workstation login | 2 |
|  | Message received | 3 |
|  | Message receipt audit file created | 4 |
| Message receipt audit file created |  | 5 |
|  | Signed & encrypted message receipt acknowledgement sent to ICN | 6 |
| Message receipt acknowledgment received |  | 7 |
| Validity of response checked by comparing message receipt audit and encrypted message receipt acknowledgement. |  | 8 |
| Message validation response created |  | 9 |
|  | Message validation response received | 10 |
| VPN inactive |  | 11 |

FIG. 7 High Level Messaging Process Diagram
- Receive a Message with Approval

| ICN High Level Process | Recipient of message | Step Number |
|---|---|---|
| VPN established or activated with receiver | (Logon) | 1 |
|  | Entry workstation login | 2 |
|  | Message received | 3 |
|  | Message receipt audit file created | 4 |
| Message receipt audit file created |  | 5 |
|  | Management workstation login | 6 |
|  | Message receipt approved | 7 |
|  | Message receipt approval audit file created | 8 |
| Message receipt approval audit file created |  | 9 |
|  | Signed & encrypted message receipt acknowledgement sent to ICN | 10 |
| Message receipt acknowledgment received |  | 11 |
|  | Signed & encrypted message receipt approval acknowledgement sent to ICN | 12 |
| Message receipt approval acknowledgment received |  | 13 |
| Validity of response checked by comparing message receipt audit file, encrypted message receipt acknowledgement, message receipt approval audit file, and encrypted message receipt approval |  | 14 |
| Message validation response created |  | 15 |
|  | Message validation response received | 16 |
| VPN inactive |  |  |

*FIG. 8*  Low Level Messaging Process Diagram
- Reject a Message

| Sender of message | ICN High Level Process | Recipient of message | Step Number |
|---|---|---|---|
| | VPN established or activated with receiver | (Logon) | 1 |
| | | Entry workstation login | 2 |
| | | Message received | 3 |
| | | Message receipt audit file created | 4 |
| | Message reject audit file created | | 5 |
| | | Signed & encrypted message reject sent to ICN | 6 |
| | Message reject received | | 7 |
| | Validity of response checked by comparing message reject audit file and encrypted message reject acknowledgement. | | 8 |
| | Message validation response created | | 9 |
| | | Message validation response received | 10 |
| | Message reject signed and encrypted and sent to sender | | 11 |
| | VPN established or activated with receiver | (Logon) | 12 |
| Message reject received | | | 13 |
| | VPN inactive | | 14 |

FIG. 9 Low Level Messaging Process Diagram - Reject with Approval

| Sender of message | ICN High Level Process | Recipient of message | Step Number |
|---|---|---|---|
| | VPN established or activated with receiver | (Logon) | 1 |
| | | Entry workstation login | 2 |
| | | Message received | 3 |
| | | Message receipt audit file created | 4 |
| | Message reject audit file created | | 5 |
| | | Signed & encrypted message reject sent to ICN | 6 |
| | Message reject received | | 7 |
| | | Entry workstation login | 2 |
| | | Message received | 3 |
| | | Message receipt audit file created | 4 |
| | Message reject audit file created | | 5 |
| | | Signed & encrypted message reject sent to ICN | 6 |
| | Message reject received | | 7 |
| | Validity of response checked by comparing message reject audit file and encrypted message reject acknowledgement. | | 8 |
| | Message validation response created | | 9 |
| | | Message validation response received | 10 |
| | Message reject signed and encrypted and sent to sender | | 11 |
| | VPN established or activated with receiver | (Logon) | 12 |
| Message reject received | | | 13 |
| | VPN inactive | | 14 |

FIG. 10  Request for Quote

| Buyer Transaction State | ICN Transaction State | Supplier Transaction State | Step Number |
|---|---|---|---|
| Request for quote (RFQ) initiated | RFQ Initiated | | 1 |
| | RFQ Forwarded | RFQ Received | 2 |
| | Quote received | Quote sent | 3 |
| Quote received | Quote forwarded | | 4 |

*FIG. 11* Order Process Diagram

| Buyer Transaction State | ICN Transaction State | Supplier Transaction State | Step Number |
|---|---|---|---|
| Order initiated | Order initiated | | 1 |
| | Order Forwarded | Order Received | 2 |
| Order Related Chat Message Sent | Order Related Chat Message Received | | 3 |
| | Order Related Chat Message Forwarded | Order Related Chat Message Received | 4 |
| | Order Related Chat Message Received | Order Related Chat Message Sent | 5 |
| Order Related Chat Message Received | Order Related Chat Message Forwarded | | 6 |
| Order Updated | Order Update Received | | 7 |
| | Order Update Forwarded | Order Update Received | 8 |
| | Order Acknowledgement Received | Order Acknowledged | 9 |
| Order Acknowledged | Order Acknowledgement Sent | | 10 |

FIG. 12  Order Process Diagram - Reject Order

| Buyer Transaction State | ICN Transaction State | Supplier Transaction State | Step Number |
|---|---|---|---|
| Orders can be rejected by the supplier at any point in the process after the Supplier has received the initial order and before an acknowledgement is made. | | | 1 |
| | Order Reject Received | Order Rejected | 2 |
| Order Rejected | Order Reject Forwarded | | 3 |

FIG. 13  Invoice Process Diagram

| Buyer Transaction State | ICN Transaction State | Supplier Transaction State | Step Number |
|---|---|---|---|
|  | Invoice Received | Invoice Initiated | 1 |
| Invoice Received | Invoice Forwarded |  | 2 |
|  | Invoice Related Chat Message Received | Invoice Related Chat Message Sent | 3 |
| Invoice Related Chat Message Received | Invoice Related Chat Message Forwarded |  | 4 |
| Invoice Related Chat Message Sent | Invoice Related Chat Message Received |  | 5 |
|  | Invoice Related Chat Message Forwarded | Invoice Related Chat Message Received | 6 |
|  | Invoice update received | Invoice Updated | 7 |
| Invoice Updated | Invoice update forwarded |  | 8 |
| Invoice Acknowledged | Invoice acknowledgement received |  | 9 |
|  | Invoice acknowledgement Forwarded | Invoice Acknowledged | 10 |

FIG. 14  Invoice Process Diagram - Reject Invoice

| Buyer Transaction State | ICN Transaction State | Supplier Transaction State | Step Number |
|---|---|---|---|
| Invoice can be rejected by the buyer at any point in the invoice process before an acknowledgement is made. | | | 1 |
| | | | 2 |
| Invoice Rejected | Invoice reject received | | 3 |
| | Invoice reject forwarded | Invoice rejected | 4 |

FIG. 15A Delivery Process Diagram

| Buyer Transaction State | ICN Transaction State | Supplier Transaction State | Shipper State | Step Number |
|---|---|---|---|---|
| | Delivery Ticket Received | Delivery Ticket Sent | | 1 |
| | Delivery Ticket Forwarded | | Delivery Ticket Received | 2 |
| | Delivery Ticket Acknowledgment Received | | Delivery Ticket Acknowledgement Sent | 3 |
| | Delivery Ticket Acknowledgment Forwarded | Delivery Ticket Acknowledgment Received | | 4 |
| Delivery Ticket Notification Received | Delivery Ticket Notification Sent | | | 5 |
| | Title Transfer Received | Title Transfer Sent | | 6 |
| | Title Transfer Forwarded | | Title Transfer Received | 7 |
| | Title Transfer Acknowledgement Received | | Title Transfer Acknowledged | 8 |
| | Title Transfer Acknowledgement Forwarded | Title Transfer Acknowledgement Received | | 9 |

| FIG.15A |
|---|
| FIG.15B |

FIG. 15

FIG. 15B *Delivery Process Diagram*

| | | | | |
|---|---|---|---|---|
| Status Update Received | Status Update Received | Status Update Received | | Status Update sent | 10 |
| | Status Update Forwarded | Status Update Received | | 11 |
| Delivery Ticket Received | Delivery Ticket Received | | Delivery Ticket Sent | 12 |
| | Delivery Ticket Forwarded | | | 13 |
| Delivery Ticket Acknowledgement Sent | Delivery Ticket Acknowledgement Received | | | 14 |
| | Delivery Ticket Acknowledgement Forwarded | | Delivery Ticket Acknowledgement Received | 15 |
| | Delivery Ticket Notification Sent | Delivery Ticket Notification Received | | 16 |
| | Title Transfer Received | | Title Transfer Sent | 17 |
| Title Transfer Received | Title Transfer Forwarded | | | 18 |
| Title Transfer Acknowledged | Title Transfer Acknowledgement Received | | | 19 |
| | Title Transfer Acknowledgement Forwarded | | Title Transfer Acknowledgement Received | 20 |
| Delivery Acknowledgement Sent | Delivery Acknowledgement Received | | | 21 |
| | Delivery Acknowledgement Forwarded | Delivery Acknowledgement Received | Delivery Acknowledgement Received | 22 |

FIG. 16  Delivery Process Diagram - Rejected by Shipper

| Buyer Transaction State | ICN Transaction State | Supplier Transaction State | Shipper State | Step Number |
|---|---|---|---|---|
| | | | Deliveries can be rejected by the shipper any time after a Delivery Ticket or a Title Transfer is received and before the Title Transfer is Acknowledged. If there is not title transfer to the shipper, then the rejection must occur before the Delivery Ticket is acknowledged. | 1 |
| | Delivery Reject Received | | Delivery Reject Sent | 2 |
| | Delivery Reject Forwarded | Delivery Reject Received | | 3 |
| Delivery Cancellation Received | Delivery Cancellation Sent | | | 4 |

FIG. 17  Delivery Process Diagram - Rejected by Receiver

| Buyer Transaction State | ICN Transaction State | Supplier Transaction State | Shipper State | Step Number |
|---|---|---|---|---|
| Deliveries can be rejected by the buyer any time after a Delivery Ticket or a Title Transfer is received and before the Title Transfer is Acknowledged. If there is not title transfer to the shipper, then the rejection must occur before the Delivery Ticket is acknowledged. | | | | 1 |
| Delivery Reject Sent | Delivery Reject Received | | | 2 |
| | Delivery Reject Forwarded | | Delivery Reject Received | 3 |
| | Delivery Cancellation Sent | Delivery Cancellation Received | | 4 |

FIG. 18A *Payment Process Diagram - Rejected by Receiver*

| Buyer | Buyer Bank | ICN | Supplier Bank | Supplier | Step Number |
|---|---|---|---|---|---|
| Payment Request Made | | Received Payment Request | | | 1 |
| | Receive Payment Request | Forward Payment Request | | | 2 |
| | | Forward Payment Notice | | Received Payment Notice | 3 |
| | Send Payment Response | Payment Response Received from Buyer Bank | | | 4 |
| Payment Response Received | | Payment Response Forwarded to Buyer | | | 5 |
| | Send Payment Request to Supplier Bank | Payment Requested Received from Buyer Bank | | | 6 |

FIG. 18

FIG. 18B  *Payment Process Diagram - Rejected by Receiver*

| Buyer | Buyer Bank | ICN | Supplier Bank | Supplier | Step Number |
|---|---|---|---|---|---|
| | | Payment Request Forwarded to Supplier Bank | Received Payment Request | | 7 |
| Notice of Payment Request Forwarded to Supplier Bank | | Payment Request Forwarding Notification sent to Buyer | | | 8 |
| | | Payment Response received from Supplier Bank | Send Payment Response to Buyer Bank | | 9 |
| | Received Supplier Bank Payment Response | Payment Response forwarded to Buyer Bank | | | 10 |
| Supplier Bank Payment Response received | | Payment Response forwarded to Buyer | | | 11 |
| | | Payment Response Forwarded to Supplier | | Payment Response Received | 12 |
| | | Remittance Forwarded to Supplier | | Remittance Received | 13 |
| | | Payment Acknowledgement received | | Payment Acknowledgement sent to Buyer | 14 |
| Payment Acknowledgement received | | Payment Acknowledgement forwarded | | | 15 |

FIG. 19  Payment Process Diagram - Rejected by Buyer Bank

| Buyer | Buyer Bank | ICN | Supplier Bank | Supplier | Step Number |
|---|---|---|---|---|---|
| Payment Request Made | | Received Payment Request | | | 1 |
| | Receive Payment Request | Forward Payment Request | | | 2 |
| | | Forward Payment Notice | | Received Payment Notice | 3 |
| | Send Payment Response Payment Response is to reject payment | Payment Response (Rejected) Received from Buyer Bank | | | 4 |
| Payment Response (Rejected) Received | | Payment Response Forwarded to Buyer | | | 5 |
| | | Payment Cancellation Sent to Supplier | | Payment Cancellation Received | 6 |

FIG. 20A *Payment Process Diagram - Rejected by Supplier Bank*

| Buyer | Buyer Bank | ICN | Supplier Bank | Supplier | Step Number |
|---|---|---|---|---|---|
| Payment Request Made | | Received Payment Request | | | 1 |
| | Receive Payment Request | Forward Payment Request | | | 2 |
| | | Forward Payment Notice | | Received Payment Notice | 3 |
| | Send Payment Response | Payment Response Received from Buyer Bank | | | 4 |
| Payment Response Received | | Payment Response Forwarded to Buyer | | | 5 |
| | Send Payment Request to Supplier Bank | Payment Requested Received from Buyer Bank | | | 6 |

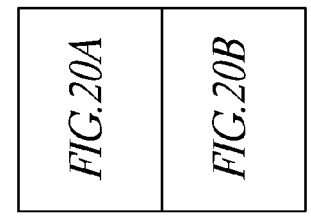

FIG. 20

FIG. 20B *Payment Process Diagram - Rejected by Supplier Bank*

| Buyer | Buyer Bank | ICN | Supplier Bank | Supplier | Step Number |
|---|---|---|---|---|---|
| | | Payment Request Forwarded to Supplier Bank | Received Payment Request | | 7 |
| Notice of Payment Request Forwarded to Supplier Bank | | Payment Request Forwarding Notification sent to Buyer | | | 8 |
| | | Payment Response (Reject) received from Supplier Bank | Send Payment Response (Reject) to Buyer Bank | | 9 |
| | Received Supplier Bank Payment Response (Reject) | Payment Response (Reject) forwarded to Buyer Bank | | | 10 |
| Supplier Bank Payment Response (Reject) received payment cancelled | | Payment Response (Reject) forwarded to Buyer | | | 11 |
| | | Payment Cancellation Sent to Supplier | | Payment Cancellation Received | 12 |

FIG. 21  Payment Process Diagram - Rejected by Supplier before payment request is sent to Buyer Bank

| Buyer | Buyer Bank | ICN | Supplier Bank | Supplier | Step Number |
|---|---|---|---|---|---|
| Payment Request Made | | Received Payment Request | | | 1 |
| | Receive Payment Request | Forward Payment Request | | | 2 |
| | | Forward Payment Notice | | Received Payment Notice | 3 |
| | | Payment Rejection Received | | Payment Rejected | 4 |
| Payment Rejection Forwarded | | Forward Payment Rejection | | | 5 |

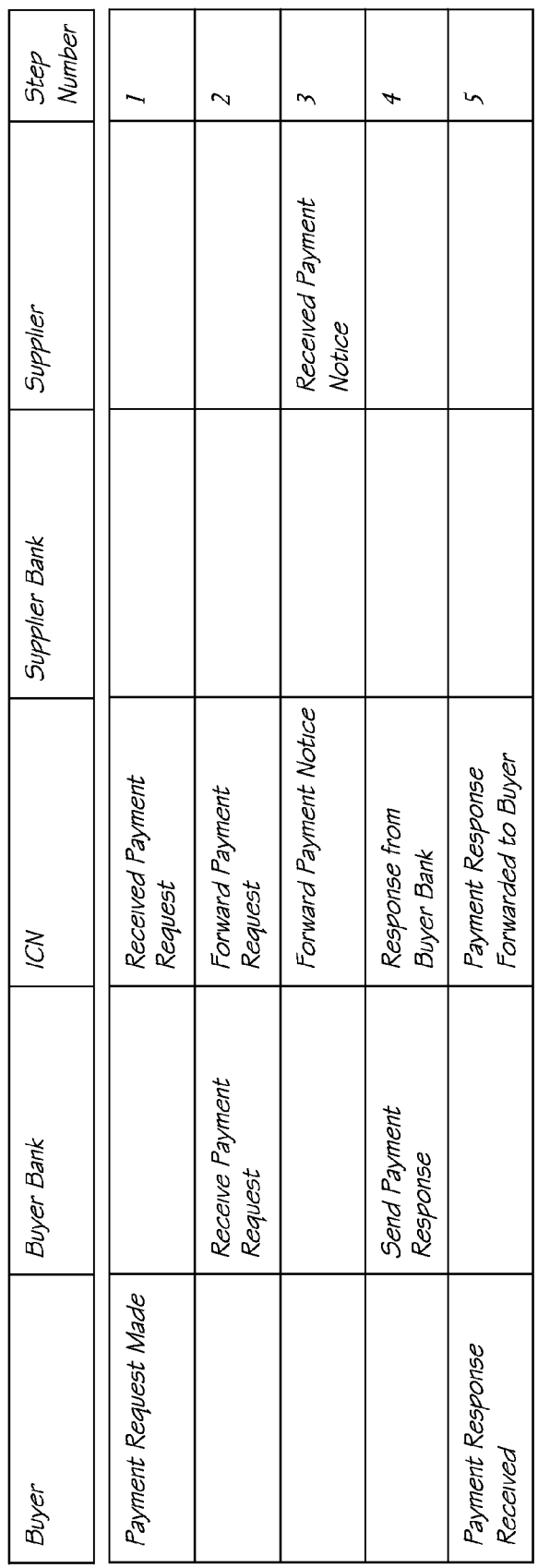
FIG. 22A  Payment Process Diagram - Rejected by Supplier after payment request is sent to Buyer Bank
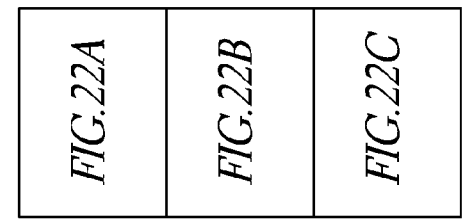
FIG. 22

FIG. 22B  Payment Process Diagram - Rejected by Supplier after payment request is sent to Buyer Bank

| Buyer | Buyer Bank | ICN | Supplier Bank | Supplier | Step Number |
|---|---|---|---|---|---|
|  | Send Payment Request to Supplier Bank | Payment Request Received from Buyer Bank |  |  | 6 |
|  |  | Payment Request Forwarded to Supplier Bank | Received Payment Request |  | 7 |
| Notice of Payment Request Forwarded to Supplier Bank |  | Payment Request Forwarding Notification sent to Buyer |  |  | 8 |
|  |  | Payment Response received from Supplier Bank | Send Payment Response to Buyer Bank |  | 9 |
|  | Received Supplier Bank Payment Response | Payment Response forwarded to Buyer Bank |  |  | 10 |
| Supplier Bank Payment Response received |  | Payment Response forwarded to Buyer |  |  | 11 |
|  |  | Payment Response Forwarded to Supplier |  | Payment Response Received | 12 |
|  |  | Remittance Forwarded to Supplier |  | Remittance Received | 13 |
|  |  | Payment Reject received |  | Payment Reject sent | 14 |

FIG. 22C *Payment Process Diagram - Rejected by Supplier after payment request is sent to Buyer Bank*

| Buyer | Buyer Bank | ICN | Supplier Bank | Supplier | Step Number |
|---|---|---|---|---|---|
| Payment Reject Received | | Payment Reject Forwarded | | | 15 |
| | | Payment Reversal initiated. Money is moved from Supplier Bank Back to Buyer Bank using the same method that money was moved to the Supplier Bank. Buyer cannot reject that movement of money. | | | 15 |

| FIG.23A | FIG.23B | FIG.23C |

FIG. 23

FIG. 23A Authentication Process

| Sender Workstation | Sender ICN client site application server | Sender ICN client site validation server | ICN process | Recipient | Step Number |
|---|---|---|---|---|---|
| | | Logon (Server to server) | | | 1 |
| | | | Establish VPN with buyer | | 2 |
| Login (Client to server) | Login (Client to server) | Session registration and authentication for individual accountability: ICN remote site application server to security server | | | 3 |
| Creates order (or request for quote) | | | | | 4 |
| Local audit once order ready | | | | | 5 |
| | | Receipt of WS audit file then audit file decryption and database file | | | 6 |
| WS send encrypted data to app. Server | | | | | 7 |

FIG. 23B Authentication Process

| Sender Workstation | Sender ICN client site application server | Sender ICN client site validation server | ICN process | Recipient | Step Number |
|---|---|---|---|---|---|
| | Decryption of order data then Reflection to management WS | | | | 8 |
| Management WS validates order | | | | | 9 |
| Sends order | | | | | 10 |
| Local audit once order validated | | | | | 11 |
| | | | Receipt of WS audit file then audit file decryption and database file | | 12 |
| WS send encrypted data to app. Server | | | | | 13 |
| | Decryption of order data then ... sent to validation server with Supplier's ID | | | | 14 |
| | | Decryption of order data then | | | 15 |

FIG. 23C Authentication Process

| Sender Workstation | Sender ICN client site application server | Sender ICN client site validation server | ICN process | Recipient | Step Number |
|---|---|---|---|---|---|
| | | | | Option - Total confidentiality: Give symmetric key for data exchange and encrypt | 16 |
| | | Option 1- Total confidentiality: Negotiate Supplier's symmetric key for data exchange and encrypt | Option - Total confidentiality: Negotiate Supplier's symmetric key for data exchange and encrypt | | 17 |
| | | Option 2- data path through: Sign hash of the message with ICN public key | | | 18 |
| | | | Order received | | 19 |
| | | | Order decryption and data integrity resolution via hash comparison and data audit comparison completed | | 20 |
| | | | Order data acknowledged with receipt message | | 21 |
| | | | Order and receipt sent | | 22 |
| | Receipt message received | | | Receives order | 23 |
| | | | VPN inactive | | |

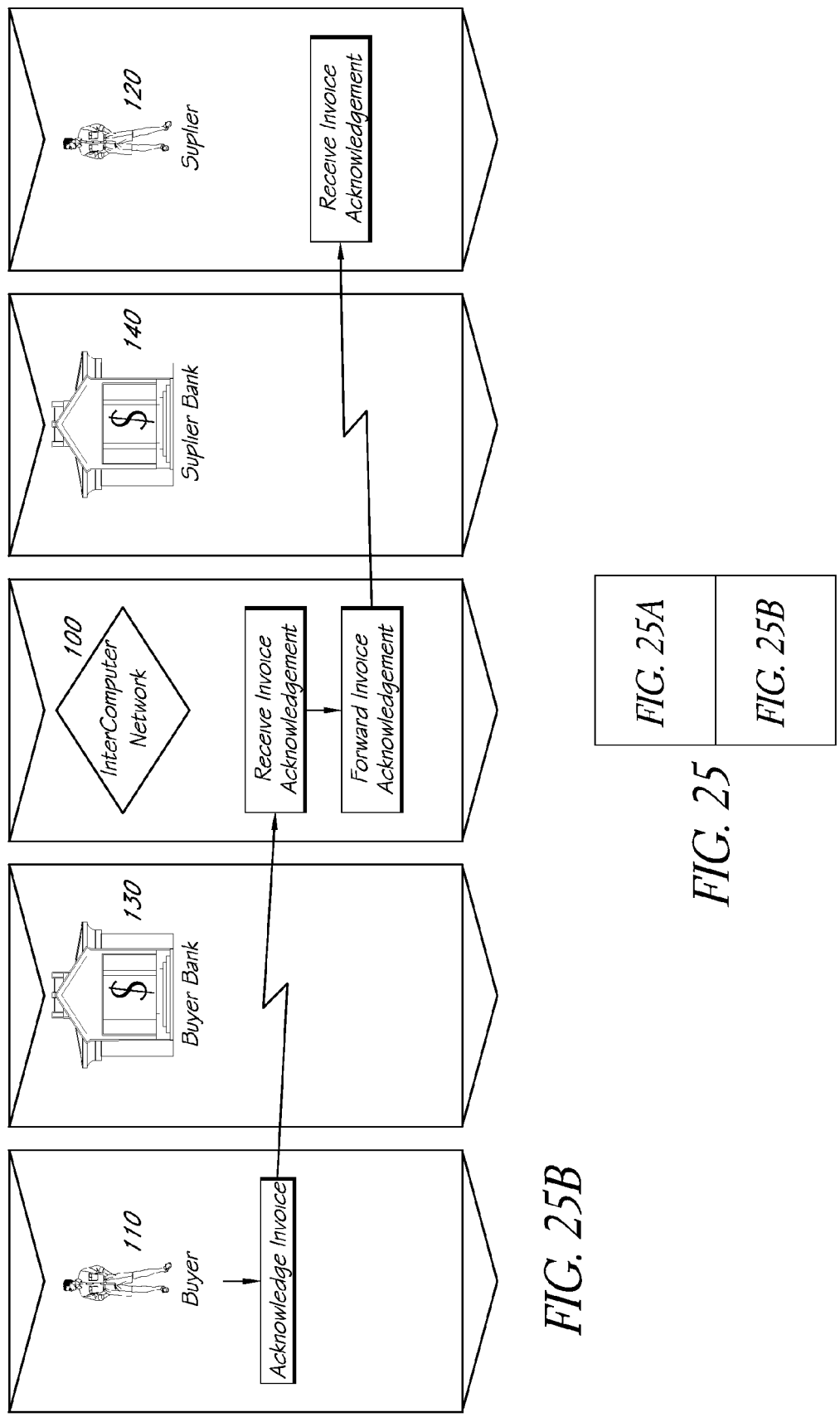

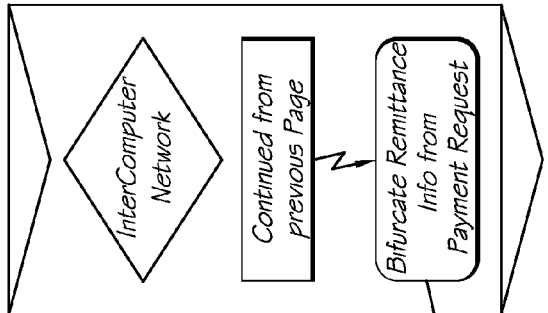
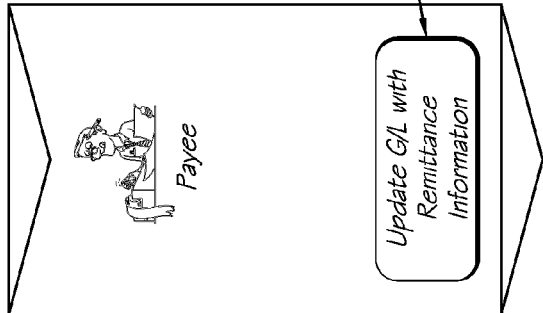
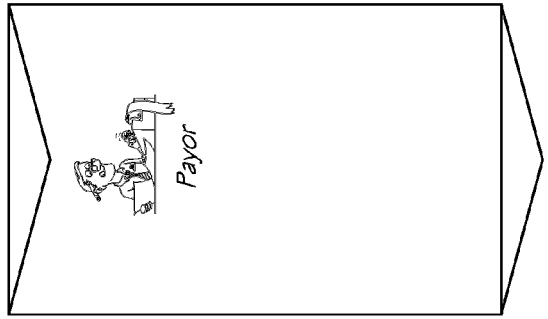
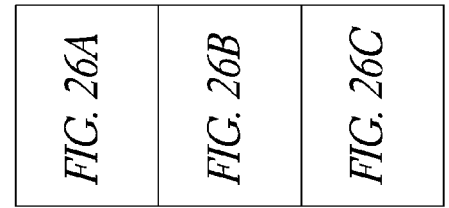
FIG. 26C
FIG. 26

SECURE ELECTRONIC PAYMENT MESSAGING SYSTEM WITH RECONCILABLE FINALITY

REFERENCE TO RELATED APPLICATION

This application is a continuation of U.S. application Ser. No. 10/679,275, filed Oct. 10, 2003, titled "SECURE ELECTRONIC PAYMENT MESSAGING SYSTEM WITH RECONCILABLE FINALITY", which claims priority under 35 U.S.C. §119(e) from Provisional Application No. 60/417,697, filed on Oct. 10, 2002, the entirety of which is hereby incorporated by reference.

BACKGROUND OF THE INVENTION

1. Field of the Invention

The present invention relates to electronic payment systems and more particularly, to systems for allowing the secure execution of business-to-business, business-to-bank and bank-to-bank transactions with real-time finality of transactions.

2. Description of the Related Art

Electronic banking systems provide the convenience of transacting with banks or other financial institutions without the need to have some form of physical access to the bank or one of its branch offices. In non-electronic banking, this physical access could be by having a customer travel to a bank or branch office in person, by physically mailing or otherwise delivering a payment instrument of some kind (e.g., a check) to the bank or branch office, or by some other physical manifestation of an intent to initiate a financial transaction with the bank holding an account for the customer. These physical, non-electronic transactions were once standard for interactions between a bank and its customers.

For transactions between banks or other financial institutions, there have been various electronic banking systems used in order to expedite the large-scale and high-volume transactions needed in order for banks to function effectively. However, such systems may not be available or effective for transactions between bank customers, even large commercial customers, and their banks.

In addition, many electronic banking systems impose delays or the requirement for one or more trusted intermediary financial institutions in order to provide effective resolution to electronic banking transactions. Such requirements introduce undesirable overhead into banking transactions.

Therefore, there is a continued need for improved systems and techniques for electronic banking in order to improve the speed and efficiency of electronic banking, particularly for commercial transactions.

SUMMARY OF THE INVENTION

In one aspect of the techniques described herein, a method for finalizing an electronic fund transfer that is matched to an invoice for is presented. The payment is to be made from a first party having a financial account at a first bank to a second party having a financial account at a second bank. The transaction is conducted using a network transfer system that is in electronic communication with the first party, the second party, the first bank and the second bank.

In a further aspect of the technique, the step of generating at the first party a document which authorizes the payment of the invoice is performed. This document is signed using a first digital certificate in accordance with the procedure of a certificate authority in electronic communication with the transfer network system.

In another aspect of the technique, the signed digital is sent from the first party to the network transfer system electronically, and may be authenticated via the certificate authority to demonstrate the authority of the signer of the signed document to assent to payment of the invoice.

In another further aspect of the system, a copy of the signed digital document may be stored in a database associated with the transfer network system;

For purposes of summarizing, certain aspects, advantages and novel features have been described herein. It is to be understood that not necessarily all such advantages may be achieved in accordance with any particular embodiment. Thus, the systems described may be embodied or carried out in a manner that achieves or optimizes one advantage or group of advantages as taught herein without necessarily achieving other advantages as may be taught or suggested herein.

BRIEF DESCRIPTION OF THE DRAWINGS

The above mentioned and other features will now be described with reference to the drawings of the present securement system. The shown embodiments are intended to illustrate, but not to limit the invention. The drawings contain the following figures:

FIG. 4 is a process diagram for a message creation process;

FIG. 5 is a process diagram for a message send process;

FIG. 6 is a process diagram for a message receive process;

FIG. 7 is a process diagram for a message approval process;

FIG. 8 is a process diagram for a message reject process;

FIG. 9 is a process diagram for a process for rejecting an approved message;

FIG. 10 is a process diagram for a request for quotation process;

FIG. 11 is a process diagram for an order process;

FIG. 12 is a process diagram for a rejected order process;

FIG. 13 is a process diagram for an invoice process;

FIG. 14 is a process diagram for a rejected invoice process;

FIG. 15 is a process diagram for a delivery process;

FIG. 16 is a process diagram for a shipment rejected by the shipper;

FIG. 17 is a process diagram for a shipment rejected by the recipient;

FIG. 18 is a process diagram for a payment process;

FIG. 19 is a process diagram for a payment rejected by the payor's bank;

FIG. 20 is a process diagram for a payment rejected by the payee's bank;

FIG. 21 is a process diagram for a payment rejected by the supplier;

FIG. 22 is a process diagram for a payment rejected by the supplier;

Figures 23, 23A:
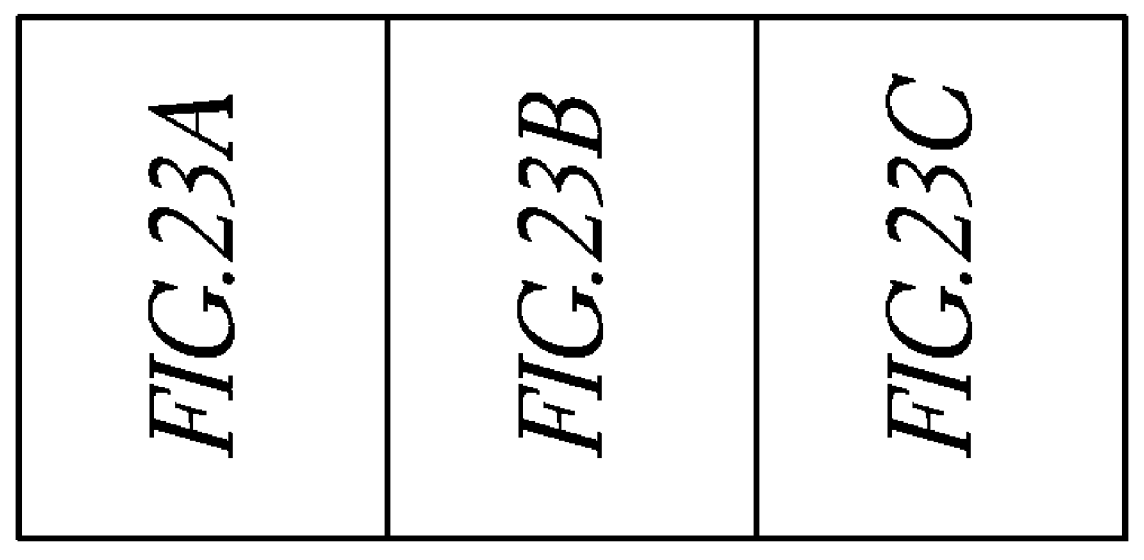

FIG. 23 is a process diagram for an authentication process;

DETAILED DESCRIPTION OF THE PREFERRED EMBODIMENT

The following description and figures describing the preferred embodiments are made to demonstrate various configurations of possible systems and techniques in accordance with the current invention. It is not intended to limit the disclosed concepts to the specified embodiments. In addition, various systems will be described in the context of a networked computer system for carrying out the described techniques and methods.

Those of skill in the art will recognize that the techniques described are neither limited to any particular type of computer or network, nor to the use of any particular hardware or software for every described aspect beyond the system itself. However the level of confidence to be given to the execution of transactions will depend on the compliance of some of the hardware platform to be used for ID, integrity and confidentiality management to specific level of security standards. It will be understood that a variety of hardware platforms meeting that standard may be used to implement the systems and techniques described herein.

To facilitate a complete understanding of the invention, the remainder of the detailed description describes the invention with reference to the Figures, wherein like elements are referenced with like numerals throughout.

Overview

Figure 1:
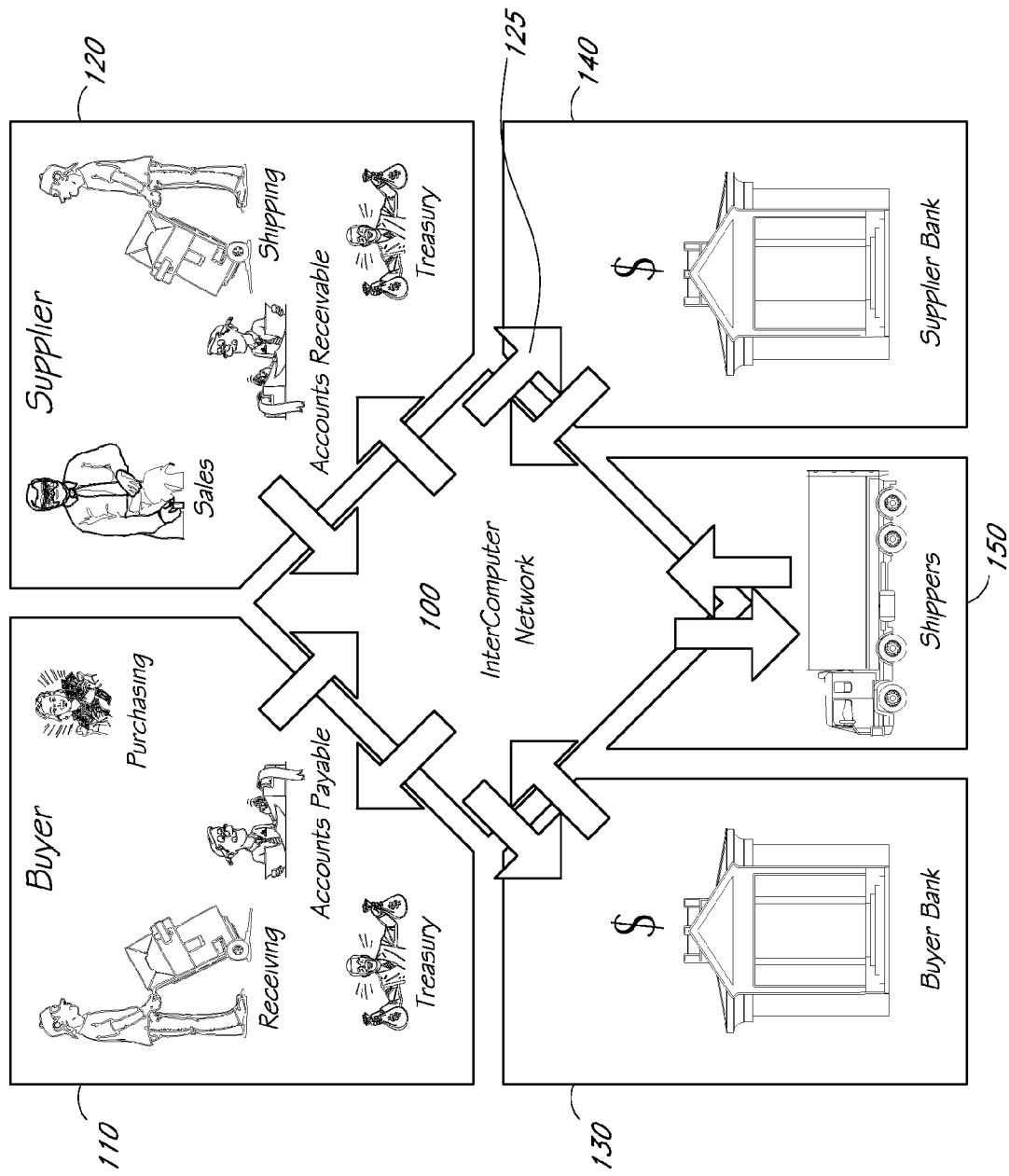
FIG. 1 schematically illustrates an overview of one embodiment of a system for providing secure electronic payment with reconcilable finality.

A transfer network system 100 for providing communications between commercial buyers 110 and suppliers 120 and their respective banks 130, 140 is illustrated in FIG. 1. This transfer network system, also referred to interchangeably herein as an InterComputer Network, or ICN is a system which is can be used to mediate and facilitate the real-time electronic banking transaction between a buyer and a supplier.

As shown in FIG. 1, a buyer 110 may be a corporation or other entity that is going to be involved in purchasing some goods or services from the supplier 120, also referred to as a seller. As the Figure shows, both the buyer and the supplier may have a number of business functions which are normally involved in a transaction between two businesses. In small companies, these functions may performed by the same individual within the company. For instance, purchasing and accounts payable functions may both rest with the same person at a small company. In a larger company, it would not be uncommon for these functions to be handled by separate people, or even separate departments. Similarly, the business functions of the supplier may be handled by one or more individuals as appropriate to the size and structure of the supplier.

In one embodiment of the described system, both the buyer 110 and the supplier 120 are connected to the ICN 100 via a communications medium 125, represented by the arrows in FIG. 1. Most typically, this connection is by both the buyer and supplier having an appropriate ICN client which is connected to the internet. The ICN system is also connected to the internet. In this way, both the buyer and the seller can communicate with the ICN system. The client system is described in greater detail below. In addition to the internet, other possible communication media include without limitation: cellular phone networks, pager networks and telephone networks.

Figure 1A:
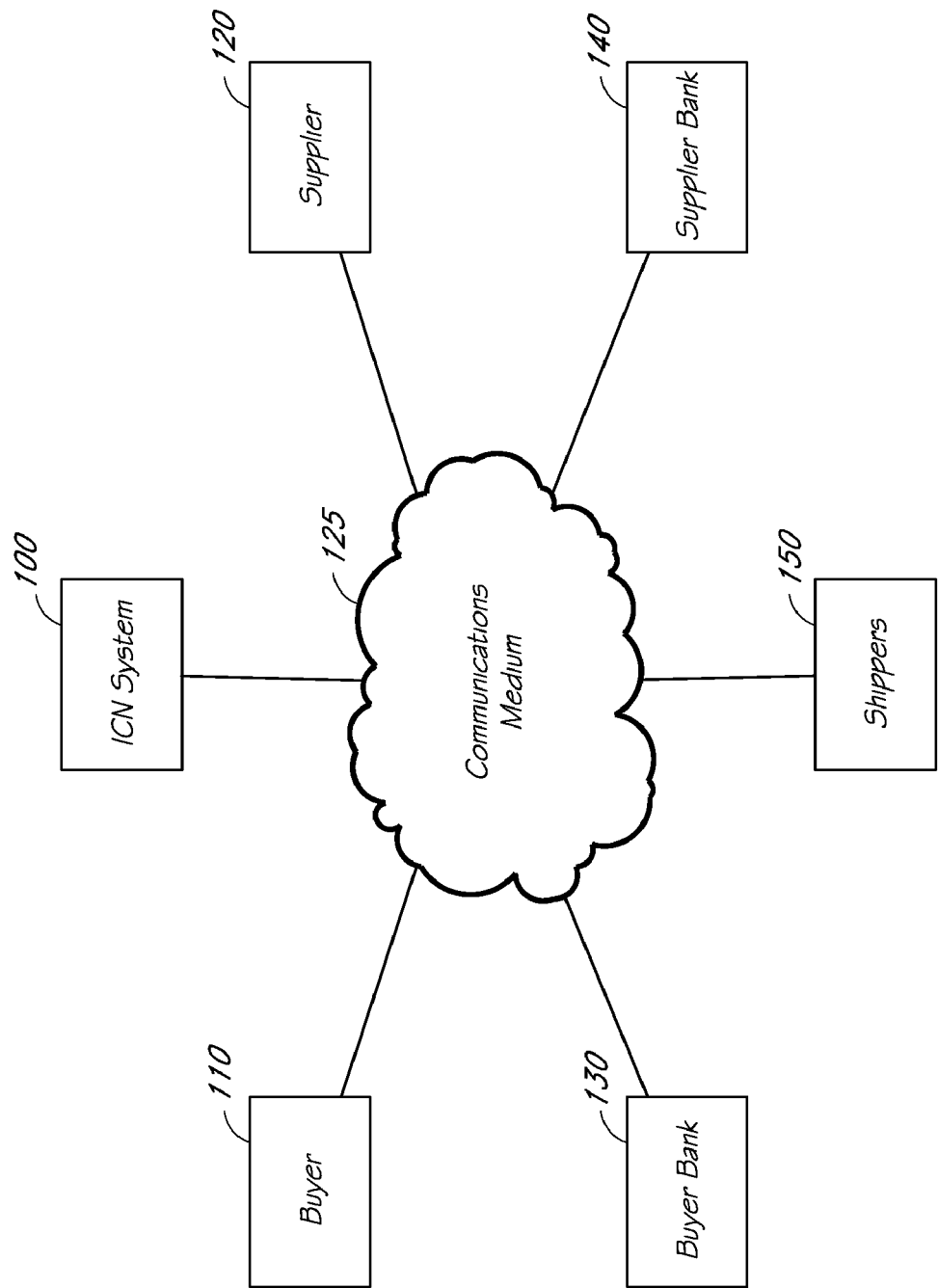
FIG. 1A illustrates an alternate schematic arrangement for the components illustrated in FIG. 1.

In addition to the ICN system 100 being connected to the buyer 110 and the supplier 120 via the communications medium 125, the ICN system 100 is also in communication with the respective banks of both the buyer and the supplier. The buyer bank 130 and the supplier bank 140 are illustrated as being separately connected to the ICN system 100, however it will be understood that this connection may also be via the internet. Although multiple connections are illustrated in FIG. 1, it will be understood that a single communications network such as the internet may provide communications between all of the illustrated elements of FIG. 1. A schematic representation illustrating the use of a central communications medium such as the internet is shown in FIG. 1A.

Additionally, the ICN system 100 may also be in communication with other entities that facilitate the transaction between the buyer 110 and the supplier 120. One such example, as illustrated in FIG. 1, is that one or more shippers 150 may be in communication with the ICN system 100. This allows the ICN system to mediate and audit the communications between the parties to the transaction and the facilitating entities.

As will be described in greater detail below, the ICN system 100 is used in combination with the ICN client at the buyer 110 and supplier 120 in order to provide an architecture that allows for the real-time processing of electronic financial transactions between the buyer and supplier, including the real-time transfer of funds between the buyer bank 130 and supplier bank 140.

ICN System

Various functional components of the ICN system 100 will now be described with reference to FIG. 2. These components are illustrated as separate functional blocks within the ICN system 100. However, it will be understood by those of skill in the art that these individual functions may be implemented in a variety of ways within the ICN system 100. For instance, these functions may be separate hardware devices, connected to one another by appropriate networking means, or may be software processes in communication with one another running on one or more pieces of general computing hardware. In general, any of the functions or modules identified within this disclosure may refer to any combination of software, firmware, or hardware used to perform the specified function or functions.

The modules described herein are preferably implemented as software modules, but may be represented partially or entirely in hardware or firmware. It is contemplated that the functions performed by these modules may also be embodied within either a greater or lesser number of modules than is described in the accompanying text. For instance, a single function may be carried out through the operation of multiple modules, or more than one function may be performed by the same module. The described modules may be implemented as hardware, software, firmware or any combination thereof. Additionally, the described modules may reside at different locations connected through a wired or wireless network, or even distributed across the Internet.

Figure 2:
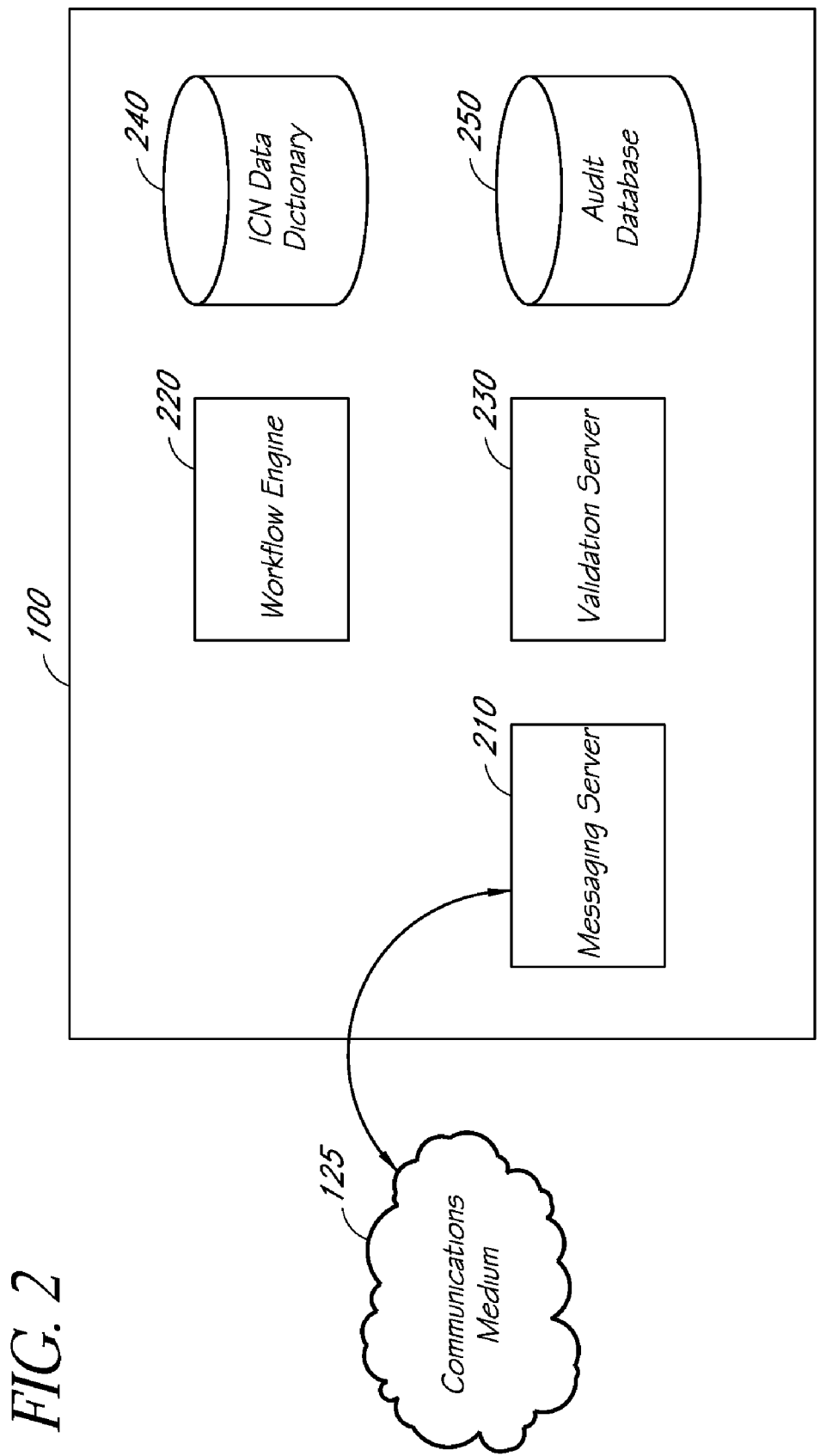
FIG. 2 illustrates a schematic representation of the ICN system of FIG. 1.

As shown in FIG. 2, the ICN system 100 is connected to the communications medium 125. In particular, the communications medium 125 is in contact with a messaging server 210 within the ICN system 100 that receives and sends messages via the communications medium 125 to the other systems, e.g., the ICN clients at the buyer and supplier and the banks. The messaging server 210 routes messages received by the from the communications medium 125 to the other portions of the ICN system 100. A workflow engine 220 contains the logic which defines the appropriate response to various incoming messages and executes the decision-making process related to properly responding to incoming messages and taking the appropriate actions. The validation server 230 is used in authenticating individuals that are sending information to the ICN system 100. The ICN data dictionary 240 contains the definitions used in the various messages being exchanged between the buyer 110, supplier 120, and their banks 130, 140, as well as other associated protocol definitions. Finally, the audit database 250 is a storage unit that receives and stores information associated with the various messages and transactions passed through the ICN system 100.

As noted above, the messaging server 210 receives and routes messages from the communications medium 125 to the workflow engine 220. As noted in FIG. 1, all transactions are mediated via a transfer network system 100 connected to both the buyer and the supplier, as well as both of their banks. This allows for the automated and rapid transfer of data through the system to the various parties to the transaction. In addition, the ICN system 100 may be configured to automatically translate the required approvals and requests between various internal formats used by buyer 110, supplier 120 and their banks 130, 140 into a standardized format in use by banks for other transactions outside of the ICN system. Examples of these formats and protocols include Universal Value Exchange (UVX) and Banking Internet Payment System (BIPS).

Because the entire transaction is carried out across the communications medium 125 and the ICN system 100, accurate status information may be made available to all parties at all stages of the transaction. This transparency of status as the transaction progresses through the authorizations from one party to the other, results in the full duplex nature of the transaction. As each phase of any process carried out through the ICN system 100 takes place (several exemplary processes are described below), records are made in the audit database 250 and with the client involved in that message. Both parties retain visibility of the transaction at all times in real time if they so wish. In addition, because these transactions only need to wait for the approval by appropriate individuals at the client site with the appropriate authority, the transaction may proceed as fast as the available communications and authentication systems are able to handle the necessary processing. This results in the real time operation of the system.

Note that although the term "real time" is used throughout this disclosure, there will necessarily be delays inherent in the operation of any transaction or transfer of data. This does not mean that the transaction is not occurring in real time. Within the context of this disclosure, "real time" may be broadly construed to refer to any transaction or event that is not placed into a holding queue for periodic processing which is often referred to as "batch processing".

Real time events are generally those which are to be handled as rapidly as possible, even when such handling may incur delays associated with the transmission or authentication of particular data. As long as the requests are not collected and queued for periodic processing (i.e., 'batch' processing), that transaction may be considered to be real time.

It should again be noted that unlike many other electronic systems designed to facilitate bank to bank transfers of funds, the current transfer network system is not designed to act as an account holder of either the banks or the parties to the transaction. No funds are committed on behalf of the ICN system 100 to settling and finalizing the financial transactions between the parties and banks.

ICN Client

In order to properly carry out transactions with the ICN system 100, appropriate ICN clients must be available to the buyer 110 and supplier 120. These ICN clients will provide the appropriate hardware and software for a commercial user to transact through the ICN system 100. An exemplary ICN client system 300 is illustrated in FIG. 3.

Figure 3:
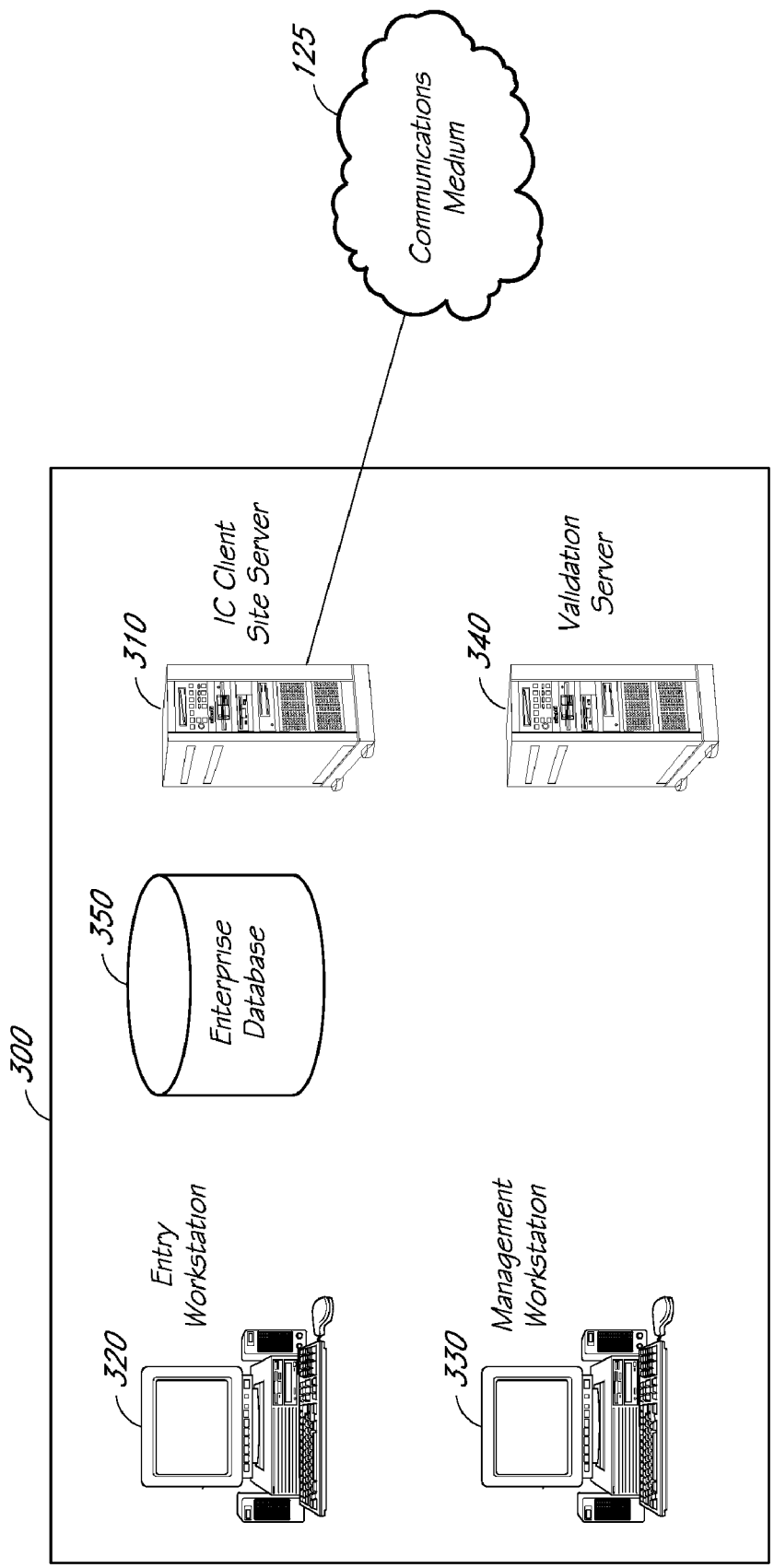
FIG. 3 illustrates a schematic representation of the ICN client of FIG. 1.
Figure 24A:
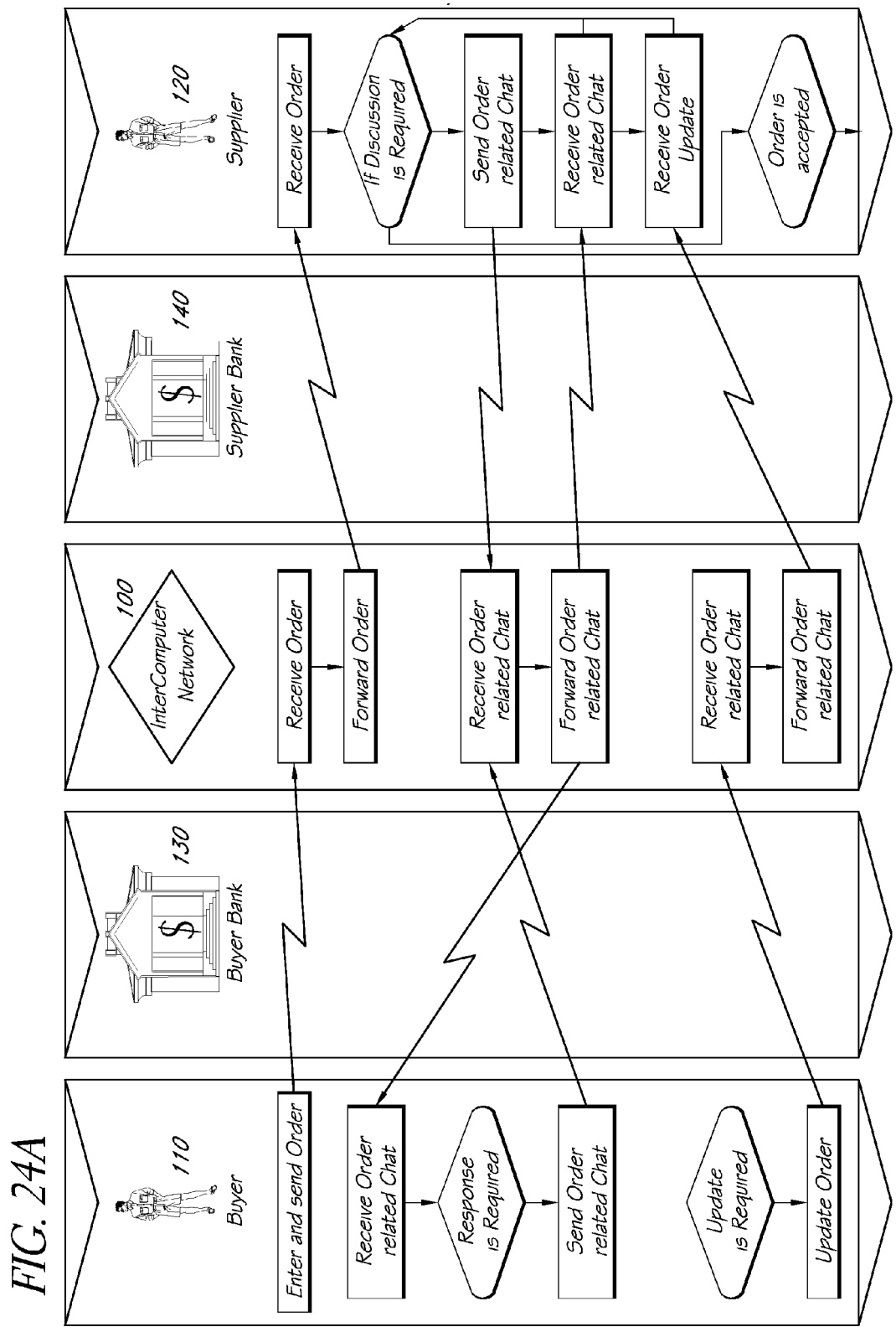
FIG. 24 is a process diagram for an order placement process.
Figure 24B:
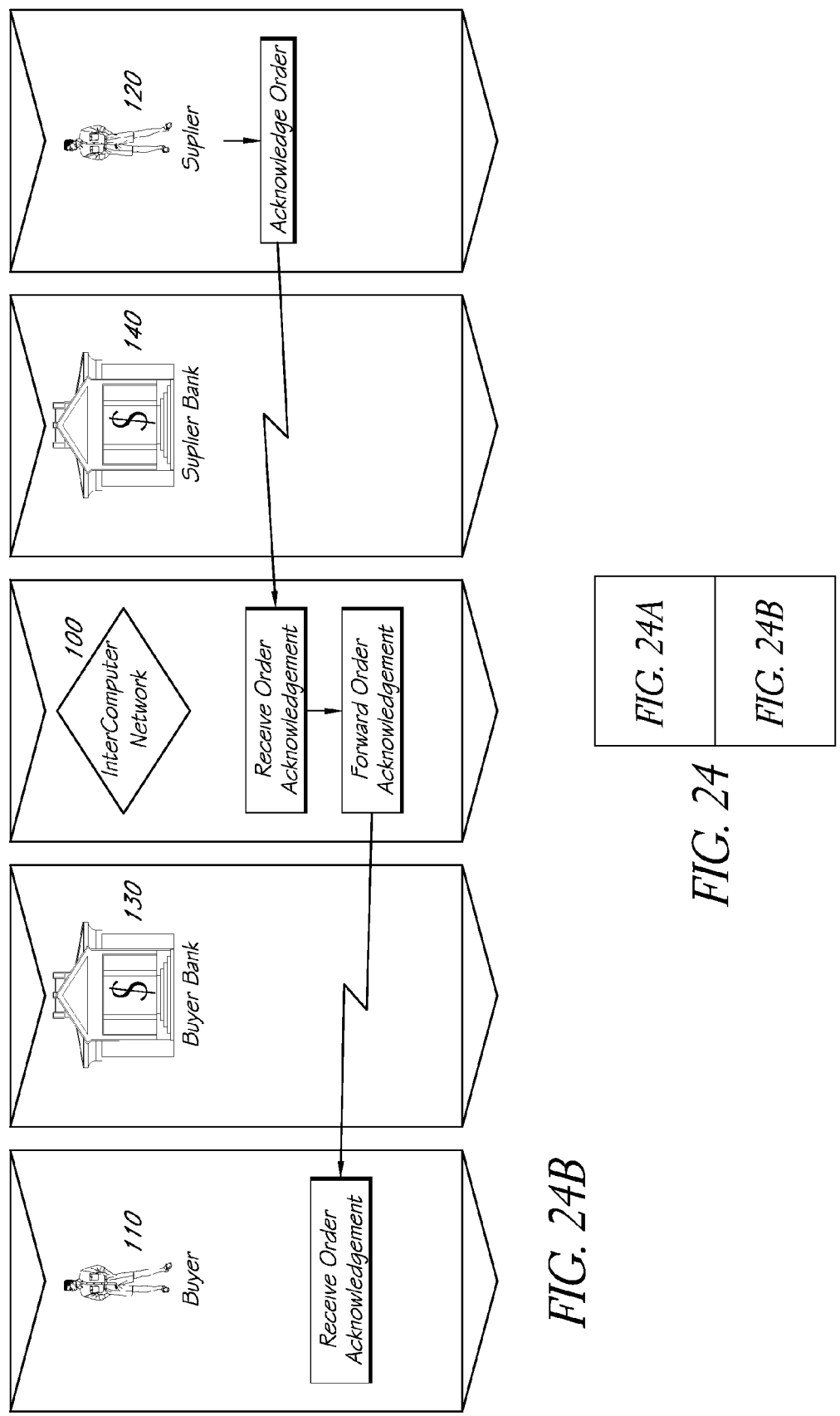
Figure 25A:
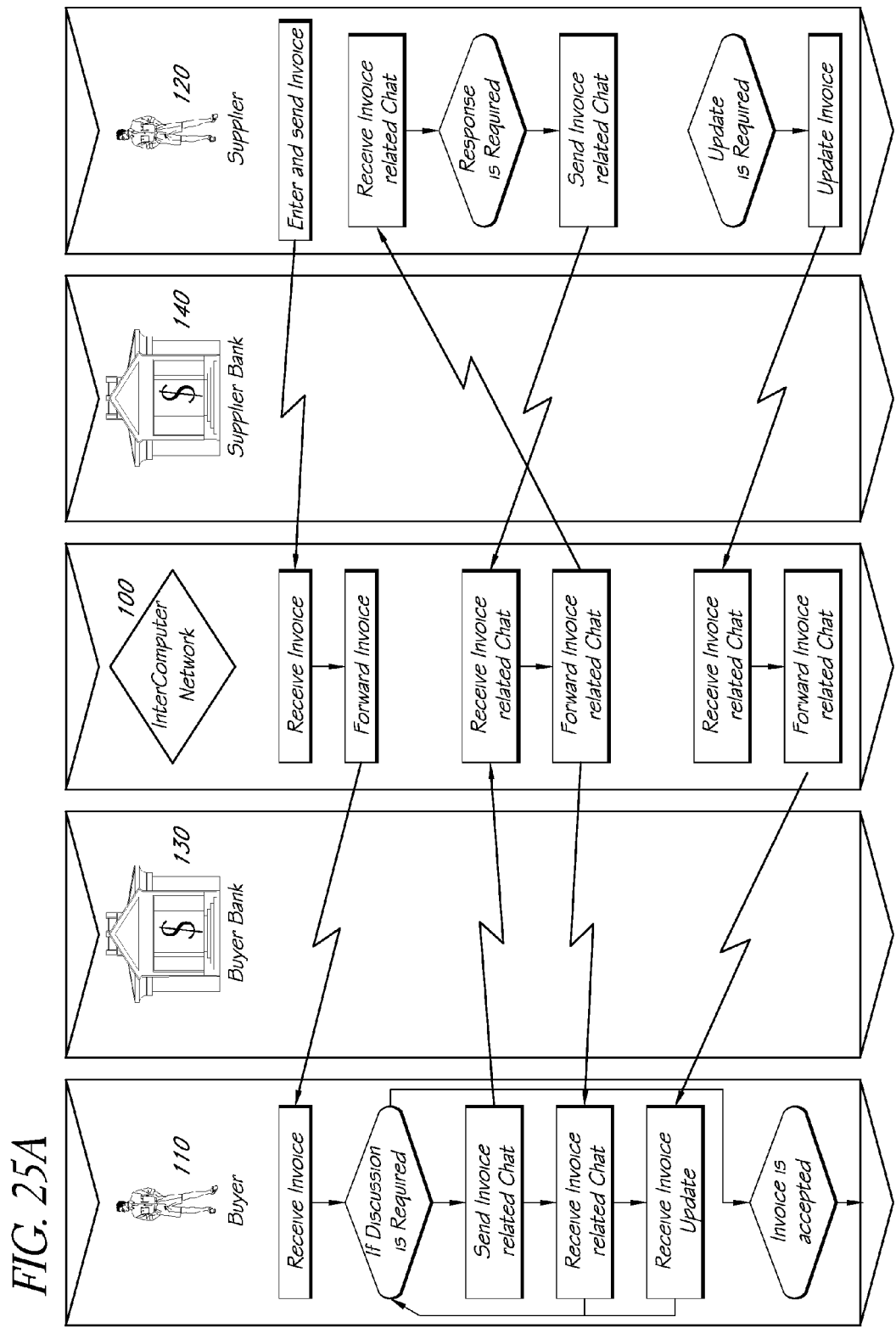
FIG. 25 is a process diagram for an invoice payment process.

The illustrated ICN client of FIG. 3 is representative of the system that would reside at a buyer 110 or supplier 120. A similar client system would also be used for a shipper or bank, such as the buyer bank 130 or supplier bank 140. Although there are several components illustrated, as with the ICN system 100 described above, it should be understood that these functional modules may be separate physical pieces of hardware, or may be implemented as software modules running on one or more systems.

A client site server 310 is illustrated as part of the exemplary ICN client 300. The client site server 310 send, receives and processes the messages to and from the ICN system 100. The client site server 310 may include a messaging client responsible for receiving message from the communications network. The messaging client of the ICN client communicates with the messaging server 210 of the ICN system 100 via the communication medium 125. The appropriate processing logic required to evaluate and route information received from the ICN system 100 is also contained within the client site server.

The ICN client 300 may also include one or more workstations. The illustrated exemplary ICN client 300 includes an entry workstation 320 and a management workstation 330. The workstations 320, 330 form the user interface through which people who are part of an electronic transaction take part. The workstations are used to initiate transactions, request proposals, respond to requests, approve or reject terms of a potential transaction, authorize payment, acknowledge receipt, and communicate with the other users in a transaction.

A validation server 340 is also part of the ICN client 300. This server is used to provide functions related to the authentication and identification of users initiating and responding to messages for the ICN system 100. This is a complementary purpose to the validation server 230 of the ICN system 100 itself.

An enterprise database 350 may also form part of the ICN client 300. The enterprise database 350 is a system that maintains data, processes, or other information useful to the operation of the business of the party operating the particular ICN client 300. For instance, an enterprise database for a bank will contain information about the bank's accounts, the holders of those accounts, the personnel working at the bank and their respective jobs, etc. Similarly, enterprise databases for buyers 110 and suppliers 120 may contain information such as the general ledger information for the business, purchasing information and purchase order generation systems, inventory control, pricing guides, or any other information that is useful in the practice of the particular business at hand.

As noted above, each client uses a variety of protocols and formats to provide the appropriate data interchange between the various parties, and between the various components within each system. The modules responsible for translating between the various protocols and formats are referred to as adaptors. Generally speaking, each system has one or more adaptors as needed in order to translate between the protocols in use in that system. The adaptors provide a means for the client site system 300 or ICN system 100 to be able to communicate with existing information systems, such as the enterprise database 350, without the need for a specialized equipment capable of working directly with the protocols and formats of the ICN system. Several examples are provided below.

For instance, an adaptor located in the ICN client 300 of the buyer 110 can be used to handle data mapping and transformations between the standard data format in use at the buyer (for instance, the format used by the enterprise database 350 of the buyer 110) and the data format in use by the ICN client 300 for communicating with the ICN system 100. An adaptor in the ICN client 300 of the supplier 120 provides a similar function in translating messages between the ICN system 100 and the internal systems of the supplier 120.

In a similar manner, adaptors in use at the banks 130, 140 of the buyer 110 and supplier 120 handle data mapping and transformations between the format of the ICN system 100 and the format for the payment system used by the bank to transact internally and with other financial institutions. In particular, the systems in use at the banks need to be able to translate messages received from the ICN system 100 into the appropriate messages to command the various financial transactions. These include 'make payment' and 'stop payment' instructions, as well as appropriate instructions to the various accounting systems in use at the bank, and queries related to transaction status.

In order to process the requests in an automated fashion, each bank will have to have its own server which handles messages transmitted in the protocol of the transfer network system 100. This server may comprise the client site server 310 for the ICN client 300 corresponding to the bank 130, 140. The protocol in use may be UVX, BIPS, or any other appropriate protocol. As discussed above, the server may be a piece of software running on an existing computing device run by the bank, or in an alternate technique, the server may be an independent computing device running the appropriate software. Generally speaking, the various adaptors can be implemented as modules that run on the server and receive and parse messages into the formats used by the various internal systems of the bank.

Transactions

Having described the components of the architecture making use of the transfer network system or ICN system 100, the various transactions that can be carried out within this architecture will now be discussed. As mentioned above, the center of the present system is a transfer network system 100 that allows for electronic payment messages to be passed directly from a buyer's bank 130 to a supplier's bank 140 by the request of an account holder at the appropriate bank (i.e., the buyer 110 or the supplier 120).

In a business to business transaction the general pattern for a payment involves a payor (in this case the buyer 110), having an account at his bank, requesting the transfer of some amount of money to the account of a payee having an account at a second bank. The transaction pattern for a payment varies depending on who presents the payment instrument to the bank. It may be the payee (e.g. in the case of a check or card at point of sale transaction) or the payor (e.g. in a giro transaction).

Generally speaking, in giro transactions, a payment instrument is presented at the financial institution of the payor in order to send funds from an account of the payor to the account of someone else. One example of such a giro-style transaction is a wire transfer that is pushed from the payor's account. (It is also possible to have a wire transfer which is a draw from an account; however, such draw-style transactions operate in most ways similar to a check-based transaction.)

Aside from the difference based upon the presenter of the payment instrument, the general pattern of a payment transaction is common to all money transfers, whether electronic, paper-based, or handled in person.

In traditional payment systems, any payment is subject to a period of time during which the payment is not "final", i.e., the credit to the payee's account is subject to confirmation (after verification) by the payor's bank and to the clearing/settlement process between the banks themselves. In electronic payment systems, it is generally the case that the instructions related to the transfer of funds can be sent from one bank to another with great speed, and can often be processed in a somewhat automated manner. However, unless the transfer is being made within a single bank, or between banks that have accounts with each other, it takes time.

The final settlement of the payment between the banks will take place via an interbank clearing/settlement system when each bank's account at their Central Bank is updated. For "normal" transactions (i.e., those that are not for very large amounts, by interbank standards) these systems normally work in "batch" mode. In batch mode processing, it is typical for transactions to be held in queue until it is time to process the accumulated transactions, either due to the size of the queue, or the time since the last batch processing. Typically, at the end of each business day or on some other regular interval, a bank will process all of its non-final transactions through its settlement system. As a result, there is still a delay between the time when all of the messages associated with the financial transaction have occurred (from the customer's point of view), but during which the transfer is not finally settled between the banks.

Furthermore in an international environment, the interbank settlement may be complicated by differences in local banking standards unless both banks participate in the same international clearing system. Generally, this results in adding at least one more level of transaction in order for banks to settle the transaction between them. Although this interbank settlement transaction is always executed, there is none-the-less a delay associated with the time during which the transaction is not yet final.

In a check or card system if the payor's account is not sufficiently credited, it will go at least twice through the whole chain, once in each direction. During the time it takes to go through the chain of systems, the transfer is in an indeterminate state, awaiting finality.

In the present system and from an information point of view the transfer network bypasses the institutional interbank systems. Each bank uses the network to verify and authenticate the individual sides of the bank to bank transaction electronically in a pre-arranged format. The transfer network system provides assurances of the authenticity of the authorization to make the transfer between the banks.

In the systems making use of the ICN system 100 to mediate financial and other business transactions, the ICN system 100 handles messages between the various entities described above. For instance, the ICN system 100 may handle messages travelling between a bank and its customer (e.g., between the buyer bank 130 and the buyer 110). The ICN system may also handle a message passing between two banks, such as the buyer bank 130 and the supplier bank 140. The ICN system may also be used to handle messages travelling between the two business parties to the transaction, e.g., the buyer 110 and the supplier 120. Additionally, the ICN system 100 may handle traffic between one or more of the parties and a third party that is part of facilitating the transaction, e.g., the shipper 150 identified in FIG. 1.

The ICN system 100 does not provide any financial accounts to any of the other parties, and does not handle any of the funds. However, a trusted settlement is still possible because of the legal reliability produced through the operation of the ICN system 100. The ICN system need not be part of a financial institution handling funds or affiliated with any financial clearinghouse or traditional settlement agency. The transfer network merely brokers the data exchange that supports the level of trust required for two banks, neither of which has an account with the other, to provide finality of a transaction in real time. In effect, the ICN system 100 acts as a secure and trusted conduit for the instructions and metadata associated with a transaction. The only requirement is that the parties 110, 120 and the banks 130, 140 are all equipped with appropriate client systems 300, 400 capable of properly interacting with the ICN system 100, as described above.

Functional Architecture

Having described the structural architecture of the systems and components for providing secure, real time financial transactions with finality, the various functional aspects of the architecture will now be described. In the description that follows, the term "function" broadly to include any process or result that can be achieved through the use of the described systems and methods.

In general, the functions provided within a particular embodiment of a system for providing real-time financial transactions with finality will be described. Although these functions may vary in implementation for different embodiments, they generally fall into three categories: service functions, security functions and support functions.

Service Functions and Components

Service functions are those functions that provide functionality directly to the users of the system. These users include the individuals using the ICN clients 300 as well as those users operating the ICN system 100 itself. In the described embodiment, these functions can include: payment message generation and distribution; non-payment message generation and distribution; payment message handling by participants; interfaces to existing systems of participants; identity management; full-duplex communication between participants; and collection of transaction fees.

The payment message generation and distribution function is directed to providing the ability for a user of an ICN client 300 to generate a document to authorize a payment to be made through the ICN system 100. Executing this process requires that the user have the appropriate level of payment authority and also that the user digitally sign a binding statement that commits the user and his organization to the particular payment.

Regardless of whether the commercial transaction associated with the particular payment occurs electronically across the ICN system 100, or is carried out across a different network, or even by hand, a transaction that requires a payment to be made will always involve an invoice to be credited to the accounts payable of the supplier 120 (the payee) and debited to the accounts receivable of the buyer 110 (the payor). An example of the script associated with the payment generation and distribution process is shown in FIG. 5.

Once the buyer 110 has an appropriately entered invoice in their accounts payable system, someone from the buyer 110 will log in with the appropriate authority and make the request that the payment on the invoice be made (see Step 1), using all of the appropriate validation and authentication required to establish that the individual assenting to the payment has the appropriate authority. In addition, the message which will be signed will include all of the appropriate data representing the party to whom the funds will be paid, and with which invoice these funds are associated.

In particular, this assent is preferably indicated via a digitally signed certificate which authenticates the authorizing party to be an individual within the buyer 110 organization with the appropriate "invoice authority", and also includes all of the appropriate data representing the party to whom the funds will be paid, and with which invoice these funds are associated. This data will be transferred in a standard format which can be automatically verified by the transfer network system against an appropriate digital certificate authority; storing a copy of the signed digital document in a database associated with the transfer network system. Note that "invoice authority" need only be the authority to accept an invoice on behalf of the buyer 110. An individual having invoice authority does not necessarily have the authority to transfer money out of the financial accounts of the buyer 110 (i.e., authority to pay the invoice). This latter authority is referred to as "payment authority".

Once assented to, a digitally signed message will be created and sent, using the protocols and procedures described above, to the ICN system 100. This payment request will be authenticated to confirm the authority of the person signing the request, and a copy of the signed digital document will be stored in the audit database 250 of the ICN system 100.

Once this assent is authenticated and stored at the ICN system 100, an appropriate message to the buyer bank 130 is sent. This message instructs the transfer of funds from the account of the buyer 110 at the buyer bank 130 to the account of the supplier 120 at the supplier bank 140. The ICN client 300 at the buyer bank 130 validates the incoming message, and once it has authenticated that the appropriate authority for the transfer is manifested and legally assented to in the message, a copy of the signed payment authorization is stored by the buyer bank 130. A confirmation of the approval (such as a copy of the authenticated assent) is sent to the supplier 120.

An payment instruction verifying the transfer of funds out of the account of the buyer 110 at the buyer bank 130 is created, and this instruction is sent to the transfer network system 100 for routing to the supplier bank 140. The message with the payment instruction is sent from the transfer network system 100 to the supplier bank 140, and an appropriate electronic payment receipt verifying the transfer of funds out of the buyer's account and into the seller's account is created. This receipt is sent back to the transfer network system 100 for storage in the audit database 250. One example of a process illustrating the above described transaction is shown in FIG. 18.

Because of the authentication of the identity of the individual assenting to the transfer between the banks, and the careful record keeping and tracking of the messages as they proceed from the ICN client 300 to the ICN system 100 and on to the appropriate banks 130, 140, the systems performing the transaction described above are able to provide certain real-time finality for the transaction. Such real-time finality is not possible without the ICN system 100 and its associated procedures and protocols.

By providing a trusted medium for the exchange of legally binding and digitally signed assent to the transfer of funds, the banks are able to process the transaction as if they had received an appropriately signed physical payment instrument. Furthermore, because the identities, authorities, and messages associated with the transfer can be validated in an automated fashion using the validation servers 230, 340 of the ICN system 100 and the ICN clients 300, the finality is achieved even more quickly than with physical payment systems.

By having appropriately stored and authenticated copies of the signed messages and receipts associated with the transaction, and by having the messages provide the appropriate level of legal certainty required by the Electronic Funds Transfer Act, the transactions carried out electronically between the two banks can be finalized immediately, without the need to wait for any portion of the transaction to clear through a central clearing house settlement process. The transaction is settled in real-time.

This is possible because the supplier bank 140 that is receiving the inflow of funds is able to trust in the same authority that was manifested in the digitally signed payment instruction forwarded to the buyer bank 130. Once acknowledged by the supplier bank 140, the transfer is accomplished, and the transaction is now complete with no obstacle to the final settlement arising from the business parties, since the identity and assent and authorization of all parties has been properly validated by each other party to the transaction. This mutual cross-validation provides trust sufficient to allow the effective quantification of the risks associated with a potentially bad transaction. Because of the quantifiability of the reliability of transactions carried out using this system, such transactions may be able to be insured, similarly to the transactions carried out through a settlement clearinghouse. This will be discussed in greater detail below.

Another aspect that supports the trust of the electronic transaction is related to the fact that all ICN clients 300 can only be used under a proper service level agreement (SLA) between the buyer, seller, or bank using the ICN client 300 and the operator of the ICN system 100 itself. This SLA is used to provide a legal framework mandating that the equipment and software in use as the ICN client 300 conforms to appropriate security standards. In exchange for these duties of maintenance and particular terms of operation, a level of legal confidence can be associated with the transactions performed and records stored on these systems.

This also allows each party in the transaction to get insured for the liability that they are carrying. Unlike a traditional electronic system where insurance underwriters cannot depend upon the reliability of electronic records and transactions reaching a predictable level, the systems presented herein allow a quantifiable and reliable level of trust in the information presented. This is made possible through the use of secure electronic techniques (such as encryption and user authentication), appropriate legal frameworks and duties associated with using the system (service level agreements) and the use of legally binding language being attached to all messages that commit a party to a transaction (the use of Regulation E compliant language in the digitally signed and authenticated messages).

In addition to the general transaction script described above and shown in FIG. 18, another function that has to be provided is for the case where messages are passed between the buyer 110 and the supplier 120, but there is no financial transaction that takes place. In such circumstances, the ICN system 100 is still used to mediate the interaction, but no communication is necessary between the ICN system 100 and the banks 130, 140 of the buyer 110 and seller 120.

One example of such a transaction is shown in FIG. 11. This particular example of a non-financial transaction message is related to the placing of an order by the buyer 110 with the supplier 120. As can be seen in the Figure, the buyer initiates the transaction in step 1, and prepares an order message which is forwarded to the ICN system 100 for authentication and forwarding to the supplier 120. The Figure illustrates how the appropriate back and forth interactions between the buyer 110 and the seller 120 are mediated the ICN system 100 in the same way in which the transfer network system was used to mediate a payment instruction from the buyer bank 130 to the seller bank 140. Once the sale terms are agreed to by both parties authorizing equivalent sales terms, the appropriate transaction can be initiated, for instance by ordering the delivery of goods to the buyer 110.

Both companies can update the information in their ICN clients 300, and can also pass the appropriate information to the enterprise database 350 to update the general ledger, inventory, accounts receivable or other internal data related to the transaction.

Regardless of whether the above transaction occurs electronically across the same transfer network 100 mediating any financial communications, or is carried out across a different network, or even by hand, the business transaction will result in an invoice which is to be credited to the accounts payable of the buyer 110 and debited to the accounts receivable of the supplier 120.

A third type of service function that is provided is payment message handling by the banks that are ICN clients 300. This function handles the processing of instructions that are normally provided in standard interbank formats and protocols, such as InterBIPS. Standard instructions are received by a bank, and these instructions are routed through the appropriate adaptor to be processed by the bank.

When, for example, the buyer bank 130 receives this data, it is in a format which the bank 130 is able to process automatically in order to determine the appropriate transfer to execute with respect to the supplier bank 140. Normally, at this stage, the process would be delayed as the buyer bank 130 was forced to verify the authority of the individuals who approved (i.e., signed) the electronic payment instructions, and the transaction would remain unsettled and non-final during this period. However, because the buyer bank 130 is able to validate that the transaction was signed by an individual of appropriate authority at the buyer 110 (via the digitally signed documents that are forwarded from the transfer network system 100), the buyer bank 130 can process the transaction request in real-time (i.e., as it is received) and directly approve the transfer of funds, informing the transfer network system 100 of its approval of the transaction.

Another service function that is provided is that of identity management. Identity management refers to the process of managing and maintaining the database of profiles of individuals and how they are authorized to use the functions available through the ICN system 100 and ICN clients 300. This function is related to the authentication function, as well as the directory services components discussed below with respect to the security functions. Through the appropriate use of identity management processes, alerts can be triggered, abuses can be detected and responded to, and auditing of transactions can take place.

As discussed above with regard to non-financial message exchanges, the service functions also include the ability to provide for full-duplex communication between the various ICN clients 300 that are connected to the ICN system 100 by the communication network. This follows the same script and pattern as described above. This allows for the real-time exchange of text message in a bidirectional exchange. This capability (as discussed above) is only available when both parties have access to and active connections with the ICN system 100.

One additional service function provided by the systems described herein is that of transaction fee collection. This is a function that allows tracking of the amount of traffic and the value of the transactions associated with particular ICN clients 300. This information can be stored and aggregated in order to provide an appropriate basis for usage-based billing of the parties making use of their ICN clients. Additionally, this information can automatically be used to generate invoices which can be sent in a properly pre-formatted payment message by the ICN system 100.

Security Functions and Components

Security functions are the functions provided and enabled by the architecture that address the issues related to the trust that can be placed in the information flowing through the ICN system 100. In particular, security functions are used to prevent transactions that are not properly authorized or authenticated from taking place, and alerting the appropriate ICN clients 300 and individuals using the system so that the failure of the transaction may be addressed. Such failed transactions may be due to a variety of improper operation circumstances other than improper authentication. For instance, a failure to deliver a message across the communications medium 125 may result in a failure for a script for a particular process to be followed successfully. Similarly, the crash of one of the systems, for instance, the validation server 340 at an ICN client 300, could also terminate the progress of a pending process, and require an alert to be generated.

The various modules and components of the ICN system 100 and ICN clients 300 interact with the security functions that may be provided by the clients themselves and the underlying communications medium 125. Security related data may be obtained via the operating system and appended to messages transferred between the ICN system 100 and the ICN clients. This allows the various modules to identify what data and processes are associated with specific users. Through the use of the identity management functions described above, the transaction security data can be associated with the appropriate messages and authorizations.

One example of a type of security data that can be derived is the Organizational ID (OID), which is a part of the Black Forest Group Quality Attribute, defined by the X.509v3 standard.

Audit functions are a type of security function that is provided. As transactions occur and the messages related to those transactions are passed through the ICN system 100, the events and messages are audited by the ICN system 100. During the audit process, two types of audit are performed.

The first is performed at a data field level, where the content of the field is examined to detect alterations that may have been made by another user. This is different from the standards based integrity checks (either hash or Hamming) that are performed to ensure data fields have not suffered data degradation due to any manner of electronic malfunction or disturbance, like exposure to electro-motive force (in transmission) or electro-magnetic force (hard disk storage). This comparison is used to identify the party who is responsible for the changes to the data in the message. If changes in the data are found where they should not be found, an alert or responsive event to the alteration in the data can be triggered.

The second type of audit is the creation of audit data records in the audit database 250 of the ICN system 100. The audit records are build from the continuous flow of discrete data transactions and captured in a transaction tracking system which records each discrete transaction to prevent data loss in event of a computer "down", transmission failure, or general power loss. The data file of the audit record is formed and provided with a subsequent integrity check from the operating system. The actual media used for the audit database archiving must provide suitable levels of data recovery capability in event of electronic or physical damage.

This audit trail that is provided by the information placed into the audit database 250 provides a level of trust to users of the system. This is because any transaction which is mediated through the ICN system 100 will have the appropriate authenticated messages identified in the audit database, allowing for a quantifiable ability to review and evaluate transactions after they have occurred. By providing such a capability for reliable after the fact analysis and reproduction of transactions as they originally occurred, the system becomes reliable in a manner very similar to systems which make use of physical markers (such as signed checks) to provide an auditable record of past transactions. Such quantifiable trust in the system can allow insurers to have the ability to underwrite policies that depend upon known levels of reliability in the transactions being carried out, so as to limit the total liability exposure of the parties to transactions mediated through the ICN system 100.

In addition to audit functions and functions provided through the capabilities of the ICN system 100 or the ICN clients 300, other security functions are also available through the operating system or through third-party software. These can include, for example, digital certificate analysis software for identification purposes. For example, when identity authentication is performed during a log in process, the operating system compares a data "secret" presented by the end-user with a secret available to the operating system. The operating system can audit these events as well. It will be understood that a variety of different digital signature authorities could be used without altering the fundamental nature of the system described.

So when specific security functions of the network or operating system are executed, the network or operating systems security and audit features can record the activity along with the logged in identity for the activity. Selected data fields from the system's audit record can then be sent to the ICN system or client and analyzed after the fact. More detail regarding logging in to the ICN system can be found below.

These audit features form s the basis for a continuous audit, and allow transaction audit records to be compared with system audit records in order to perform specific data analyses. A common comparison that may be performed via the network and operating system's security functions is a comparison related to the use of a digital certificate.

Additional security functions of the network and operating system can provide the basis for establishing and corroborating the security functions provided by the ICN system 100 and ICN clients 300.

One such feature is authentication. The process of corroborating an identity and the resultant assignation of identity within the operating systems is used throughout the processing performed by the ICN system and ICN clients. Such functions require both network log on and an appropriate log in of a user of appropriate authorization. (Log on and log in are discussed in greater detail below.) Such end to end authentication increases the reliability and trust that can be generated by the systems described herein.

Another standard that plays a role in the security functions available when using the ICN system 100 is the X.509 V3 standard. Different from Identity authentication techniques and systems (like the log in process described below) are identity management regimes. One example is the Public Key Infrastructure (PKI) component of Registry Authority (RA). The RA uses cryptography to bind the names of participants with electronically discernable markings for identity.

To obtain the highest level of clarity and verifiability for use with I-C transactions, electronic identities are bound to the individuals using the ICN clients 300 using the X.509 V3 standard for digital certificates and in accordance with the Black Forest Group Quality Attributes. The combination of X.509 digital certificates with the V3 (version 3) Black Forest Group Quality Attribute extensions allows any participant company to advertise their employees' electronic credentials via X.500 directory services. This also allows other participants to access these credentials via directory protocols, such as LDAP. The credentials provided by the supplier 120 can be used by the buyer 110 and vice versa. Similarly the credentials provided by the ICN system can be used by all participants and ICN clients, and the use of these reference numbers with the quality attribute.

Throughout the authentication and credential related processes described, analysis of the credentials is performed by appropriate processing on the validation servers 230, 340 of the ICN system 100 and the ICN clients 300.

Various uses can be made of the authentication and comparison features available through the validation servers. Digital certificates can be decomposed into data fields for comparison, e.g., the Company Name and Individual Name in the X.509 certificate can be compared with those in the X.509 V3 extension to ensure they are the same. Elements of the X.509 V3 certificate can be resolved by the validation server to determine what an individual may have been authorized to do in the course of business. Based upon the electronic policies of the certificate consuming company, suitably defined access controls can be defined for use in allowing access to data or services.

As mentioned above, alerts may be provided in order to provide notice to a user or administrator or other individual associated with the ICN system or client when a process is outside the expected behavior. For instance, lack of digital certificate integrity can be used to signal an immediate alert from the validation server. Other examples include noting a potential abuse of the system when any conflict in information between the digital certificate of a client and the OID of the Quality Attribute.

Abuse management is a function that relies on a pre-established scheme of known and unknown exposures. When using the architecture and systems described herein, various types of abuse management functions may be made available. They include without limitation: protection and deterrent mechanisms, and the ability to trigger real-time or delayed countermeasures. Such features can make use of login metrics, initiation algorithms, data capture and communication checks, including checks based on the quality attributes of certificates used throughout the sessions. Such information can be used to generate appropriate error messages for transmission and display to an appropriate user. These abuse warning may also be recorded in the audit database 250 of the ICN system for later review and analysis.

The ICN system 100 provides content abuse detection and alerting. In addition to the abuse detection provided by the ICN client's validation server 340, the ICN system 100 services include abuse detection of content for content management. The ICN system records the streamed audit of all transactions and files the audit records in the audit database 250 for subsequent review.

Communications between the entry workstation 320, the management workstation 330 and the various other devices may be made using a Secure Socket Layer (SSL) protocol to protect data transmissions. SSL protocol yields session level encryption and provides a distinct identity for the workstation communications protocols. This further allows a greater degree of data protection to the ICN system 100 and a higher degree of trust in the data stored therein.

As discussed above, directory services, such as X.500 standards-based directories, are used by the ICN system and ICN clients and their various components for proper addressing. Any of these components or the modules running on them can look up the correct address for any other individual registered with the ICN system. The information available includes address specifics, company names (e.g., X.500 Distinguished Name), as well as specific information in the Black Forest Group defined Quality Attribute.

Support Functions and Components

The support functions deal with operation and maintenance of the system under normal conditions and back-up or recovery. These functions may include without limitation: a gateway to clients that only allows properly authenticated communications, i.e., communications from users validated through a validation server; an internal secure hub for the exchange of information between all software modules of the ICN system and the ICN clients, based on a workflow engine and audit records; a message repository; a data dictionary and configuration metadata; and maintenance functions for recovery and backup.

The workflow engine 220 defines and executes different workflows. The workflow engine 220 creates standard and ICN data objects based on the ICN data dictionary 240 definitions. The workflow engine 220 handles mapping and conversion between business data objects in different formats. The workflow engine executes data validation and business validation rules.

The ICN data dictionary 240 defines both the standard messaging set and the ICN messaging set. The ICN data dictionary defines mapping and conversion information between internal and external data formats. Internal data formats are standard and ICN format. The different interfaces with the ICN clients for the buyer 110, supplier 120 and banks 130, 140 each define external data formats.

Service, security and support functions are implemented accordingly as software elements on either standard or secure (EAL level 2 or level 4) platforms. Because the transfer network system 100 does not actually perform the transfer of any of the funds between banks (this is handled directly between the banks using any ordinary settlement system), the digital documents can be used in the same way that paper copies of signed payment orders or checks would be used. This allows the transfer network system operator to only be liable for the authenticity of the documents they transfer, and not the funds at issue.

It should be noted that the appropriate language necessary to bind the parties legally to the transaction may be inserted in the appropriate interfaces and digital documents which are signed and authenticated. In addition to providing the appropriate support for the authenticity of the documents, if it ever becomes necessary to prove the validity of the transfer instruments at a later time, the interface associated with presenting and digitally signing these documents may also be configured so as to comply with the appropriate regulations governing the transfer of funds. For instance, appropriate consent and warning language in order to comply with Regulation E or other regulations implementing the Electronic Funds Transfer Act, may be inserted into the documents that are digitally signed by the appropriate parties.

In addition to the embodiments described above, certain additional functions/components may be added to the system. For instance, a data clearing house entity may be configured to hold copies of all transaction instruments recorded by the transfer network system, and then periodically post these results to the appropriate entities for final settlement and storage. Note that this data clearing house need not clear actual financial transactions, but may act as a daily data repository which is periodically (e.g., daily) posted.

The transfer network system can also be configured to work in conjunction with a foreign currency exchange operated by one of the member banks in order to expedite international electronic bank to bank transactions. The general operation of the system is substantially as described above.

However, when a particular transaction requires funds to be converted from one currency to another, this can be performed by the currency exchange under the control of the appropriate transacting bank.

Note: in the description and Figures associated with the various transactions and transaction scripts, certain conventions are used. In each Figure in which a process or script is displayed, the first row of the Figure represents the various parties to the particular process being discussed. These may include, for example, the buyer 110, or the ICN system 100, or even a particular portion of one of the participating systems, for example, the messaging server 210 or the management workstation 330 at a supplier 120. As the steps of the process are followed (the steps are numbered separately for each Figure in the far right column), the activity or state of each of the participating systems is noted underneath the heading for that particular system. In addition, it should be noted that the abbreviation WS represents "workstation".

FIGS. 4-22 illustrate a variety of different transaction scripts that can occur during the interaction of the ICN system 100 with various ICN clients 300. These transactions include transactions that do not involve financial exchanges (see FIGS. 4-10); transactions that produce an order or invoice that is intended to be paid (see FIGS. 11-14); transactions that relate to adjacent processes such as shipping of goods in response to a properly approved order (see FIGS. 15-17); and transactions that result in the generation of payment instructions to transfer funds between financial institutions (see FIGS. 18-22).

Generic Message Exchange Script

A generic script that covers the basic process for the creation and transmission of a message between a client (either a transaction party or a bank) and the ICN system 100 will now be described. This script provides for a secure creation and delivery of a message to the ICN system, and will be used whenever a communication with the ICN system is initiated by any client system, whether the communication is related to a commercial portion of a transaction or a financial portion of a transaction.

The first step is for the client, who is the sender of the message, to generate at one of the workstations 320, 330 an order or request document. This document is prepared by a user, using the appropriate software on the workstation 320, 330 and is signed by accessing the validation server 340 and providing an appropriate authentication. In response to the authentication information, the validation server 340 will provide a digital signature that is attached to the message to be sent.

The message, now digitally signed, is then sent to the ICN system 100 electronically across the communication medium 125. This message will comprise data in a standard format which can be automatically verified by the ICN system 100 against an appropriate digital certificate authority, generally the validation server 230 of the ICN system 100. A copy of this signed digital message is stored in the audit database 250.

Once the message is authenticated properly by the validation server 230, an authorization request is sent back to the ICN client 300 from the ICN system 100. This request is routed to the management workstation 330 for approval by an appropriate individual having approval authority, as defined by the validation server 340 at the ICN client 300. Upon receipt, this message is also authenticated against the validation server 340 to confirm that it was sent from the ICN system 100.

When an appropriate user at the management workstation 330 goes to approve the request, he is presented with an appropriate interface screen giving the relevant terms of the request being approved, as well as information making clear that any digitally signed message made in response to this request is legally binding. In particular, the language of this message can be made to conform to whatever legal standard is required for creating a properly legally binding signature. Such language may, in particular embodiments, be made to provide appropriate consent and warning language in order to comply with Regulation E or other regulations implementing the Electronic Funds Transfer Act.

Figure 26A:
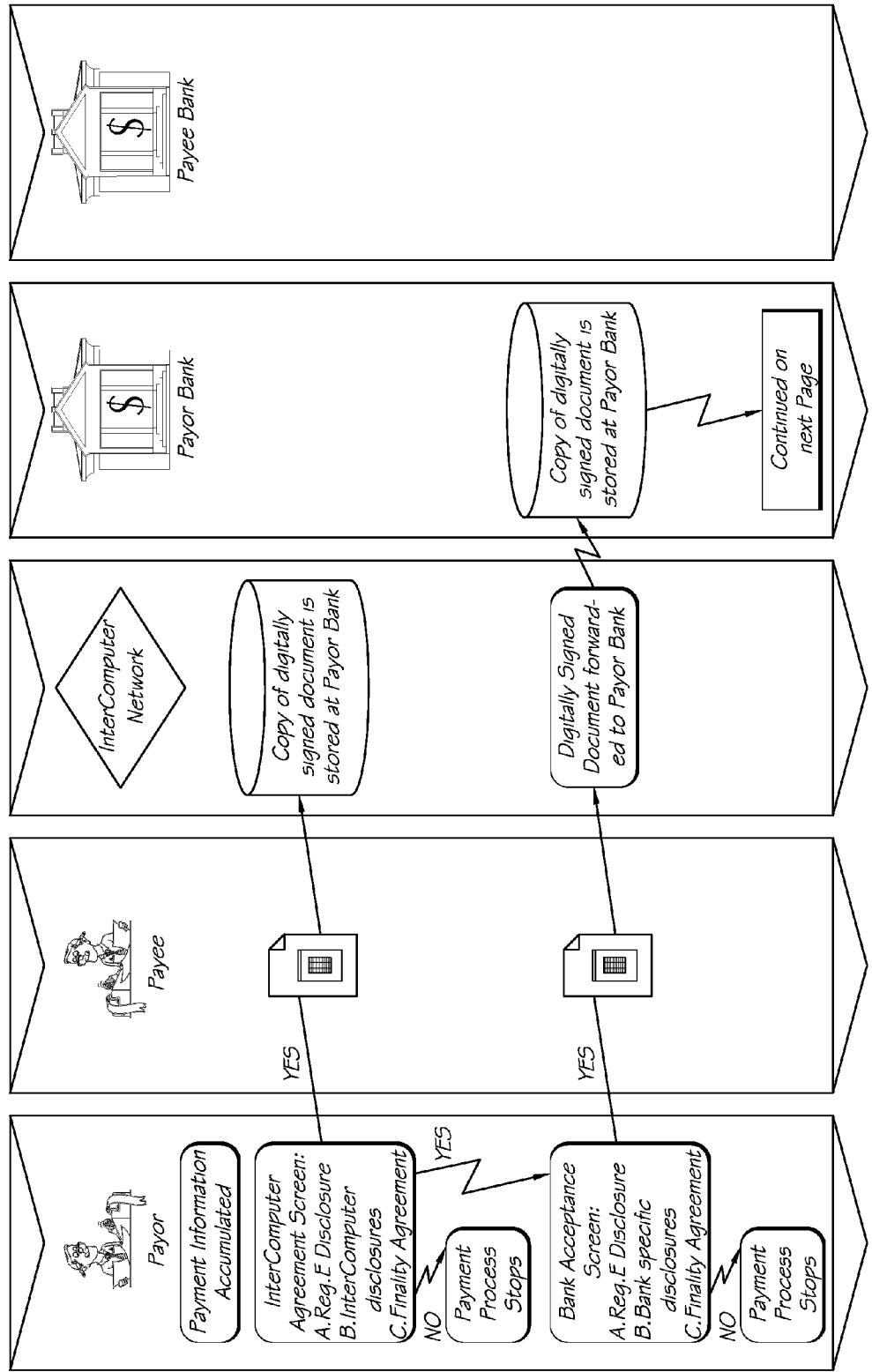
FIG. 26 is a process diagram for an invoice payment process.
Figure 26B:
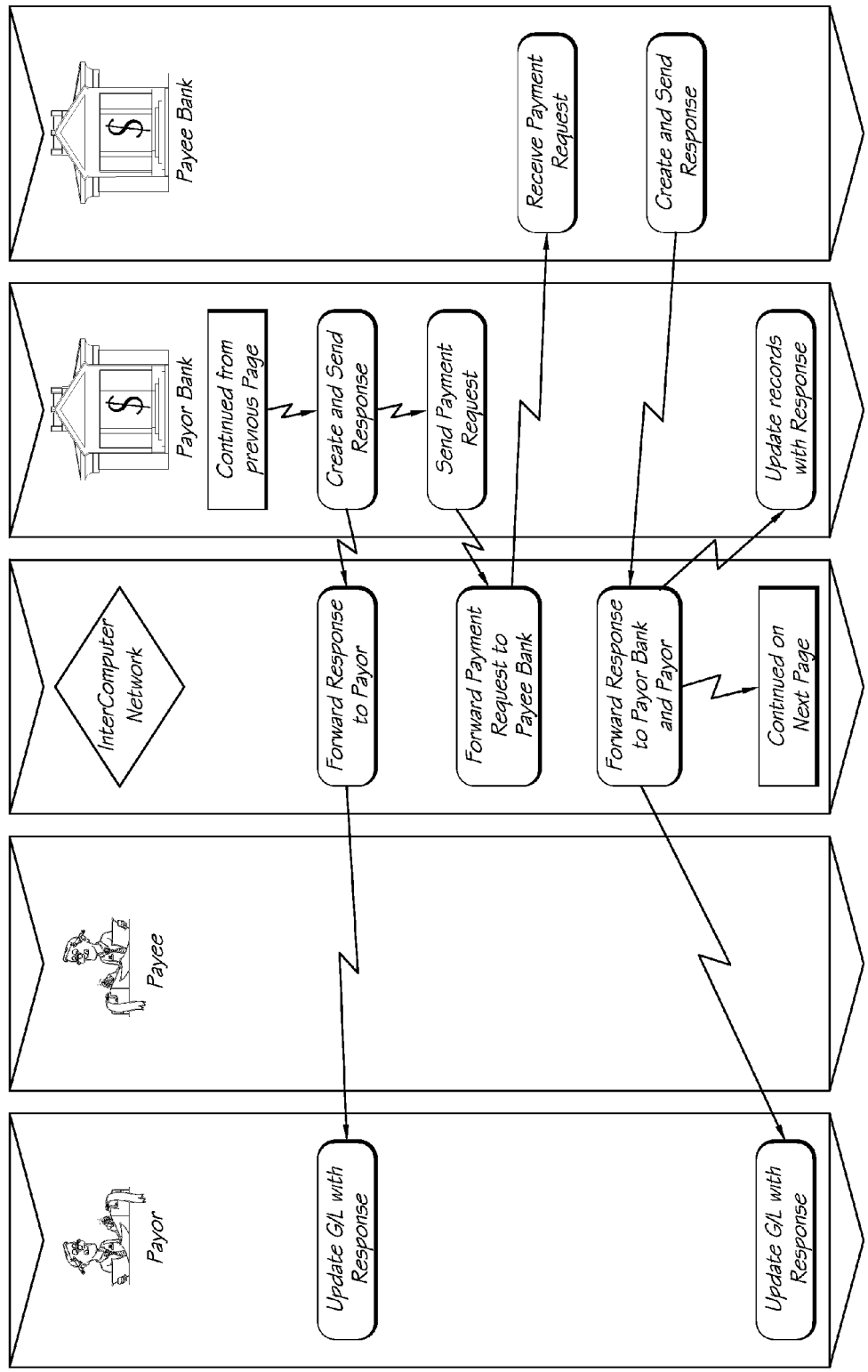

An example of type of term that is used to comply with Regulation E can be seen in the payment process shown in FIG. 26. As can be seen in the column showing the tasks performed by the payor (generally the buyer 110), an agreement screen is presented that provides the appropriate Regulation E disclosures, along with the appropriate disclosures related to the ICN system 100, and the legal agreement that the payment to be made on this invoice is final and legally binding. A copy of this digitally signed document is stored by the ICN system 100.

Another agreement providing the equivalent language needed to bind the payor's bank is also digitally signed, and forwarded to the payor bank for storage within the ICN client of the payor's bank. By having appropriately signed digital messages stored by both the bank and the payor, the finality of the transaction can be reliably assured, since each party has information that can be used to show that there was a legal transfer of funds intended and properly authorized by the payor from the payor's bank.

This message, once signed, is then sent back to the ICN system 100. The ICN system 100 appropriately authenticates that the user approving the order/request has the appropriate authority via the validation server 230, and a copy of the signed authorization request is stored in the audit database 250.

Notice of the approval of the order/request message is then sent to the intended recipient of the message. Such notice may be a copy of the authenticated assent to the message. An acknowledgement may also be sent to the sender.

This process is described as relating to an initial message between a sender and a recipient. However, the same process is used with the sender and recipient reversed when a message is responded to. The responding party (the recipient of the above described process) will send a response message to the ICN system 100, where it will be validated and sent back for authorization. The responding party will have an appropriate individual authorize the communication, after validating that it came from the ICN system 100, and then will send the digitally signed message back to the ICN system 100 for validation and forwarding to the sender of the original message. Copies will be stored in the audit database 250 as described above.

This process is generic to all communications through the ICN system 100, and will be used whenever a communication with legally binding significance is made between the parties. In addition to the validation and digital signature processes which are described, it should also be understood that encryption can be used as appropriate to further secure the contents of the messages being exchanged if this is desired. The details of the particular encryption scheme may be varied as needed, and do not effect the overall operation of the systems described herein.

Logging on and Logging in

Within the Figures and description that follow, two different processes related to establishing connections between the various described systems are noted. The first is called "logging on" to the ICN system 100. Logging on is the process of establishing a network connection between a particular ICN client 300 and the ICN system 100. This process is essentially similar to establishing a virtual private network (VPN) connection between the two systems. Data sent across this VPN is actually carried across the communications medium 125; however, an additional VPN protocol is applied on top of the normal protocols in use for the communications medium in order to establish the private nature of this communication. This logging on process is performed prior to the exchange of any messages or data that are to be carried across the ICN system to any other system.

In logging on, the ICN client 300 must properly authenticate itself to the ICN system 100. This does not require the acknowledgement of any particular user at the client 300 or any particular authority level, but merely an authentication that establishes that the ICN client 300 is a established client known to the ICN system 100 and trusted to transact across the ICN system.

Once logged on, this VPN connection is used for any further communication between that client 300 and the ICN system 100 until the end of that particular communication stream. For instance, in order to send a request for quotation (RFQ) message to a supplier 120, the ICN client 300 of the buyer 110 must first log on to the ICN system 100 and establish the appropriate connection. Similarly, prior to passing the message along to the supplier's ICN client 300, the ICN system 100 must establish the proper VPN connection by having the supplier's ICN client log on to the ICN system.

All communications to be carried between any of the ICN client systems 300 and the ICN system 100 will be carried across this VPN connection only once the client is properly logged on. For security purposes, encryption may be used at the VPN level in order to secure all of the traffic carried across the communications medium 125. Such encryption is a common feature of VPN systems.

Separate from the "logging on" process described above, the process of "logging in" is used to refer to the authentication and validation of individual users with particular levels of authority to transact across the ICN system 100. Logging on is a process which is carried out automatically by the ICN client 300 and ICN system 100 as needed in order to maintain a private communications channel across the potentially insecure communications medium 125. By contrast, logging in is a process initiated by a user in order to establish their credentials to carry out a transaction on behalf of the entity they represent (e.g., the buyer 110 or the supplier 120).

The process of logging in as a particular user is discussed in greater technical detail below. While logging in establishes that the particular ICN client 300 that is connecting to the ICN system 100 is properly authorized to exchange messages with the ICN system 100, logging on establishes the appropriate authority level associated with the particular individual that will be applying a digital signature to the messages that are being sent. This step of logging in is particularly important for those signed messages which are to be used as an indication of a legally binding transaction. For instance, in order to properly bind one of the parties, an appropriate message containing the warnings and consent and warning language in compliance with Regulation E may be digitally signed. However, such signature must be made by a party properly identified and validated to have the authority to properly bind the party. Logging in establishes the identity and authority of the digitally signing individual.

Trust, Finality, Liability Allocation & Real Time

The use of the network transfer system may avoid any liability associated with repudiated transactions (as will be discussed below) and may also eliminate the necessity to verify the availability of funds to cover the transactions requested.

Instead, the transfer network system is only liable for the accuracy of the data they provide, and the reliability of the authenticated documents that they store and deliver. By acting as a data delivery and authentication service, the transfer network system is able to forward the appropriate transfer requests and confirmations immediately, without having to perform any of its own checking as to the viability of the accounts held with the banks.

The financial accounts are handled by the banks themselves, and only the results of the transactions into and out of those accounts are forwarded through the transfer network system. In this way, the transfer network system need not vouch for the validity of the transfer itself, but rather only for the validity of the request being made via the electronic instrument.

By vouching for the validity and authenticity of the requests, the transfer network system provides a level of trust to the automated communications between the banks when requesting and confirming the payment and transfer of funds.

This trust is normally generated by having banks either intermediate their transactions through a trusted third banking institution, such as a Federal Reserve Bank or some other clearing house, or by having one of the banks have an account with the other.

The system described herein reinforce the trust mechanisms. The appropriate level of trust in the transaction instruments is backed by the authentication system and the ability of the bank to digitally verify the authenticity of the transfer documents in real time and in an automated manner by having these documents created and signed electronically.

The transfer network system 100 provides merely a trusted communications system for the banks. The banks can transact with trust in the documents used to initiate and validate the transfer. This is possible because the authentication documents stored by the transfer network system are able to be used to support the legitimacy of any transfer if required after the fact. In addition, by vouching for the validity and authenticity of the requests and responses, the transfer network system provides a level of trust to the automated communications between the banks when requesting and confirming the payment and transfer of funds. This allows a state of finality to be reached in real-time. Finality is the state where there are no remaining obstacle to final settlement of the fund transfer (e.g., there is a good faith belief by both sides that the transfer of funds is legitimate; there is no reason to suspect that the transaction will be repudiated by one or the other party; there is a legal basis for compelling the transfer of funds to occur in the even the transferor refuses).

Furthermore the systems described herein reinforce the trust mechanisms. The appropriate level of trust in the transaction instruments is backed by the authentication system and the ability of the bank to digitally verify the authenticity of the transfer documents in real-time and in an automated manner by having these documents created and signed electronically.

The use of the network transfer system may also avoid any liability associated with repudiated transactions as it significantly reduces the possibility of a repudiated transaction. For instance, a transaction will not proceed from one step to the next unless the former step has been validated and approved by the authorized person and/or its compliance to agreed procedures and values (limits) has been automatically checked.

By setting up a system in which the electronic instruments of fund transfer can be relied upon to the same degree as the physical tokens associated with ordinary fund transfer, it becomes possible to allow the banks to maintain their ordinary responsibility for the transfer of funds, while allowing the operator of the ICN system 100 to only be liable for the integrity of the data received and sent, and the reliability of the authenticated documents stored and delivered.

By acting as a data delivery and authentication service, the transfer network system is able to forward the appropriate transfer requests and confirmations immediately, without having to perform any of its own checking as to the viability of the accounts held with the banks. The financial accounts are handled by the banks themselves, and only the results of the transactions into and out of those accounts are forwarded through the transfer network system.

In this way, the transfer network system needs not vouch for the validity of the transfer itself, but rather only for the validity of the request/confirmation being made via the electronic instrument. Such a system speeds interbank clearing. This is unlike transactions in which banks either intermediate their transactions through a trusted third financial institution, such as a Federal Reserve Bank or some bilateral or multilateral clearing house, or by having one of the banks have an account with the other.

In classical systems the validation of the transfers calls for feedback, which leads to greater delay and overhead processing time. The described systems and techniques enable banks to settle transactions in one pass thus getting rid of "multi-pass" overheads and, again, reducing the time to reach the confirmation of final "money settlement".

In this way, the banks can transact with trust in the documents used to initiate the transfer. The transfer network system provides merely a trusted communications system for the banks, rather than a trusted financial account. This allows for the transactions to settle with finality in real time, and provides for non-repudiation of the transfers, without the overhead of third party financial accounts or intermediary banks, as are used in many other systems.

In addition, the authentication documents stored by the bank and by the transfer network system are able to be used to support the legitimacy of any transfer if required.

In addition to the description provided above and in the associated Figures, additional details regarding the various components and techniques described herein may be found in the attached Appendix.

The various server and client systems and the techniques for their use, as well as the variations in each that are described above thus provide a number of ways to provide secure, real-time finality to financial transactions between two parties. In addition, the techniques described may be broadly applied for use with a variety of non-financial transactions and adjacent processes as well.

Of course, it is to be understood that not necessarily all such objectives or advantages may be achieved in accordance with any particular embodiment using the devices or techniques described herein. Thus, for example, those skilled in the art will recognize that the devices may be developed in a manner that achieves or optimizes one advantage or group of advantages as taught herein without necessarily achieving other objectives or advantages as may be taught or suggested herein.

Furthermore, the skilled artisan will recognize the interchangeability of various features from different embodiments. For example, variations in the authentication protocols used by the ICN system and client may be combined with systems in which encryption is applied to more fully protect the messages in transit across the internet. These various aspects of the system design and its associated processes, as well as other known equivalents for any of the described features, can be mixed and matched by one of ordinary skill in this art to produce other architectures, devices and techniques in accordance with principles of the disclosure herein.

Although these techniques and systems have been disclosed in the context of certain embodiments and examples, it will be understood by those skilled in the art that these techniques and systems may be extended beyond the specifically disclosed embodiments to other alternative embodiments and/or uses and obvious modifications and equivalents thereof. Thus, it is intended that the scope of the systems disclosed herein disclosed should not be limited by the particular disclosed embodiments described above, but should be determined only by the scope of the claims that follow.

What is claimed is:

1. A method for finalizing an electronic fund transfer that is matched to an invoice for payment to be made from a first party having a first financial account at a first financial institution to a second party having a second financial account at a second financial institution using a transfer network system in communication with the first party, the second party, the first financial institution and the second financial institution, the method comprising:

receiving an invoice authorization document from the first party digitally signed using a first digital certificate issued by and in accordance with a procedure of a certificate authority in communication with the transfer network system;

authenticating the first digital certificate via the certificate authority to confirm that the signer of the invoice authorization document has the authority to assent to payment of the invoice;

storing a copy of the signed digital invoice authorization document in a database associated with the transfer network system;

sending a payment authorization request from the transfer network system to the first party;

receiving the payment authorization request from the first party digitally signed using a second digital certificate issued by and in accordance with the procedure of the certificate authority;

authenticating the second digital certificate via the certificate authority to confirm that the signer of the payment authorization request has the authority to assent to a transfer of funds from the first financial account of the first party at the first financial institution to the second financial account of the second party at the second financial institution;

storing a copy of the signed digital payment authorization request in the database associated with the transfer network system;

sending a copy of the signed digital payment authorization request to the first financial institution;

receiving an electronic payment instruction from the first financial institution;

forwarding the electronic payment instruction to the second financial institution; and receiving an electronic payment receipt from the second financial institution.

2. The method of claim 1, further comprising authenticating a device communicating with the transfer network system.

3. The method of claim 1, further comprising transmitting an alert if an unauthorized communication is received.

4. The method of claim 1, further comprising transmitting an alert if a communication includes unauthorized modifications.

5. The method of claim 1, further comprising communicating with a third party facilitating the electronic fund transfer.

6. The method of claim 5, wherein the third party facilitating the transaction is a third financial institution.

7. A system for finalizing an electronic fund transfer that is matched to an invoice for payment to be made from a first party having a first financial account at a first financial institution to a second party having a second financial account at a second financial institution using a transfer network system in communication with the first party, the second party, the first financial institution and the second financial institution, the system comprising:

means for receiving an invoice authorization document from the first party digitally signed using a first digital certificate issued by and in accordance with a procedure of a certificate authority in communication with the transfer network system;

means for authenticating the first digital certificate via the certificate authority to confirm the signer of the invoice authorization document has the authority to assent to payment of the invoice;

means for storing a copy of the signed digital invoice authorization document in a database associated with the transfer network system;

means for sending a payment authorization request from the transfer network system to the first party;

means for receiving the payment authorization request from the first party digitally signed using a second digital certificate issued by and in accordance with the procedure of the certificate authority;

means for authenticating the second digital certificate via the certificate authority to confirm the signer of the payment authorization request has the authority to assent to a transfer of funds from the first financial account of the first party at the first financial institution to the second financial account of the second party at the second financial institution;

means for storing a copy of the signed digital payment authorization request in the database associated with the transfer network system;

means for sending a copy of the signed digital payment authorization request to the first financial institution;

means for receiving an electronic payment instruction from the first financial institution;

means for forwarding the electronic payment instruction to the second financial institution; and means for receiving an electronic payment receipt from the second financial institution.

8. The system of claim 7, further comprising means for authenticating a device communicating with the system.

9. The system of claim 7, further comprising means for transmitting an alert if an unauthorized communication is received.

10. The system of claim 7, further comprising means for transmitting an alert if a communication includes unauthorized modifications.

11. The system of claim 7, further comprising means for communicating with a third party facilitating the electronic fund transfer.

12. The system of claim 11, further wherein the third party facilitating the electronic fund transfer is a third financial institution.

\* \* \* \* \*